United States Patent
Otake et al.

(10) Patent No.: US 9,784,118 B2
(45) Date of Patent: Oct. 10, 2017

(54) STEAM VALVE CONTROL DEVICE AND STEAM TURBINE SYSTEM

(71) Applicant: KABUSHIKI KAISHA TOSHIBA, Minato-ku (JP)

(72) Inventors: Toshikazu Otake, Yokohama (JP); Makoto Takahashi, Yokohama (JP); Hideo Hosaka, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 695 days.

(21) Appl. No.: 14/210,800

(22) Filed: Mar. 14, 2014

(65) Prior Publication Data
US 2014/0286757 A1 Sep. 25, 2014

(30) Foreign Application Priority Data
Mar. 22, 2013 (JP) .................... 2013-060422

(51) Int. Cl.
*F01D 17/10* (2006.01)
*F02C 9/20* (2006.01)

(52) U.S. Cl.
CPC ............ *F01D 17/10* (2013.01); *F02C 9/20* (2013.01); *Y10T 137/7761* (2015.04)

(58) Field of Classification Search
CPC .......... F01D 17/10; F01D 17/20; F01D 17/14; F01D 17/145; F02C 9/20; Y10T 137/7761
USPC ........................................... 415/151
See application file for complete search history.

(56) References Cited

FOREIGN PATENT DOCUMENTS

| JP | 59029703 A | * | 2/1984 |
| JP | 61-145305 A | | 7/1986 |
| JP | 2008-2337 | | 1/2008 |
| JP | 2009052471 A | * | 3/2009 |

OTHER PUBLICATIONS

Notification of Reasons for Refusal dated Jun. 7, 2016 in Japanese Patent Application No. 2013-060422 (with English language translation).

* cited by examiner

*Primary Examiner* — Woody Lee, Jr.
*Assistant Examiner* — Jesse Prager
(74) *Attorney, Agent, or Firm* — Oblon, McClelland, Maier & Neustadt, L.L.P.

(57) ABSTRACT

A steam valve control device of this embodiment controls a steam valve. The steam valve has: an upper cover in whose through hole a bush is installed; and a valve rod which is installed so as to penetrate through the through hole of the upper cover via the bush. The valve rod has a contact surface which is formed so as to come into mechanical contact with the bush when the steam valve is opened to a maximum opening degree. The steam valve control device has a control part. When a governor free operation is performed, the control part controls the steam valve by setting a limited opening degree limited to be smaller than the maximum opening degree as an upper limit. When a load limiter operation is performed, the control part controls the steam valve by setting the maximum opening degree as the upper limit.

3 Claims, 16 Drawing Sheets

STEAM VALVE CONTROL DEVICE AND STEAM TURBINE SYSTEM

CROSS REFERENCE TO RELATED APPLICATION

This application is based upon and claims the benefit of priority from Japanese Patent Application No. 2013-060422, filed on Mar. 22, 2013; the entire contents of which are incorporated herein by reference.

FIELD

Embodiments described herein relate generally to a steam valve control device and a steam turbine system.

BACKGROUND

In power plants such as a thermal power plant and a nuclear power plant, steam valves such as a steam control valve are installed in a steam turbine system in order to adjust a flow rate of steam flowing into an inlet of a steam turbine.

FIG. 15 is a cross-sectional view schematically illustrating an example of a steam valve according to a related art.

As illustrated in FIG. 15, a steam valve V10J has a valve casing 21 (valve box), an upper cover 22, a sleeve 23, a main valve 25 (valve body), a valve seat 26, and a valve rod 27, and adjusts a flow rate of steam flowing into an inlet of a steam turbine (not illustrated).

Concretely, in the steam valve V10J, the valve casing 21 is structured so that the steam flows into an inner space from the inlet (not illustrated) provided on a side portion and the steam flows out from an outlet 21E provided in a lower part. Further, the valve casing 21 has an opening 21K formed in an upper portion. The upper cover 22 is installed on the upper portion of the valve casing 21 to close the opening 21K of the valve casing 21. Further, a through hole 22K is formed in the upper cover 21. The sleeve 23 is a tubular body and its upper portion is supported by the upper cover 22 inside the valve casing 21. The main valve 25, which is a tubular body, houses the valve rod 27 therein and is supported by a lower end portion of the valve rod 27. Further, the main valve 25 is housed in the sleeve 23. The valve seat 26 is provided under the sleeve 23 inside the valve casing 21. The valve rod 27 is installed so as to penetrate through the through hole 22K of the upper cover 22 and the inside of the sleeve 23.

In the steam valve V10J, the valve rod 27 is coupled to a driving device (not illustrated) outside the valve casing 21, and by the driving device (not illustrated) driving the valve rod 27, the main valve 25 is slid in an up and down direction inside the sleeve 23. Here, the driving device (not illustrated) operates according to an opening degree instruction signal output from a control device (not illustrated). By the operation of the driving device (not illustrated), an opening degree between the main valve 25 and the valve seat 26 is adjusted and the flow rate of the steam is controlled.

Concretely, inside the valve casing 21, when the main valve 25 moves upward to separate from the valve seat 26 and a gap between the main valve 25 and the valve seat 26 is opened, the steam flowing into the inside from the inlet of the valve casing 21 flows out from the outlet of the valve casing 21. On the other hand, when the main valve 25 moves downward to come into close contact with the valve seat 26 and the gap between the main valve 25 and the valve seat 26 is closed, the flow of the steam is stopped.

By thus controlling the operation of the steam valve V10J, operations such as a governor free operation and a load limiter operation are performed. Note that the governor free operation means an operation in which a governor is freely operated according to a frequency change without a load limiter limiting the governor operation. In the governor free operation, the control is automatically performed so that an output of a rotary machine increases when the frequency decreases (the rotation of a power generator decreases), and the output decreases when the frequency increases (the rotation of the power generator increases).

In a steam turbine system, in order to improve turbine efficiency, it is required to reduce a pressure loss by operating a steam valve with the maximum opening degree. Further, in order to similarly improve turbine efficiency, it is required to reduce the leakage of steam from the steam valve during the operation.

Therefore, in order to prevent the steam from leaking from the gap between the upper cover 22 and the valve rod 27 when the steam valve V10J is opened to the maximum opening degree, improvements have been made in the steam valve.

FIG. 16 is a cross-sectional view schematically illustrating another example of a steam valve.

As illustrated in FIG. 16, in a steam valve V10, a bush 22b is installed in a through hole 22K of an upper cover 22 as is not the case in FIG. 15. Further, a valve rod 27 is installed so as to penetrate through the bush 22b in the through hole 22K of the upper cover 22. Further, in the valve rod 27, a contact surface 27S is formed so as to come into mechanical contact with the bush 22b provided in the upper cover 22 when the steam valve V10 is opened to the maximum opening degree. A projecting portion is formed on an outer peripheral surface of the valve rod 27 so as to project in a convex shape, and in the projecting portion, the contact surface 27S of the valve rod 27 is provided in a portion facing the upper cover 22. Here, the projecting portion has an inclined surface inclined with respect to an up and down direction so as to be larger in outside diameter as it goes from an upper side toward a lower side, and the inclined surface is provided as the contact surface 27S. Further, the bush 22b also has an inclined surface similar to the contact surface 27S of the valve rod 27, and is formed so that the contact surface 27S of the valve rod 27 comes into contact with the inclined surface.

However, when the governor free operation is performed by using the steam valve V10 illustrated in FIG. 16, a system frequency changes while the steam valve V10 is fully opened, and an opening degree instruction signal periodically varies, so that, in the steam valve V10, there sometimes occurs a case where the aforesaid mechanical contact between the bush 22b and the contact surface 27S of the valve rod 27 is repeated. This sometimes causes a crack of their contact portions due to fatigue failure.

As a result, it sometimes becomes difficult to safely operate the steam turbine.

DETAILED DESCRIPTION

A steam valve control device of an embodiment is configured to control a steam valve which adjusts a flow rate of steam flowing into an inlet of a steam turbine. The steam valve has: an upper cover in whose through hole a bush is installed; and a valve rod which is installed so as to penetrate through the through hole of the upper cover via the bush. The valve rod has a contact surface which is formed so as to come into mechanical contact with the bush to prevent the steam from leaking from a gap between the upper cover and the valve rod when the steam valve is opened to a maximum opening degree. The steam valve control device has a control part. When a governor free operation is performed, the control part is configured to control the steam valve by setting a limited opening degree limited to be smaller than the maximum opening degree as an upper limit in order to prevent the bush and the contact surface of the valve rod from repeatedly coming into mechanical contact with each other. When a load limiter operation is performed, the control part is configured to control the steam valve by setting the maximum opening degree as the upper limit.

Embodiments will be described with reference to the drawings.

First Embodiment

[A] Structure
[A-1] Regarding the Whole Team Turbine System

Figure 1:
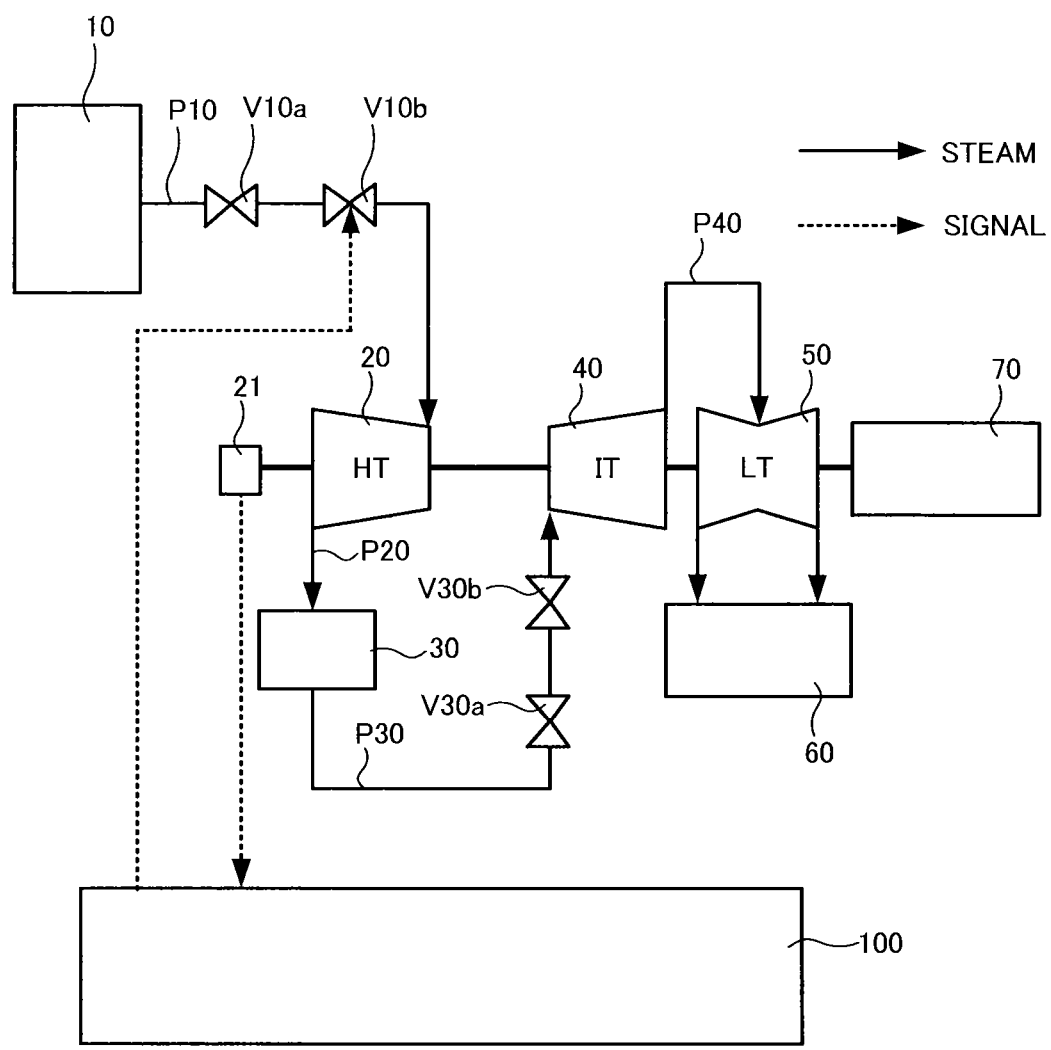
FIG. 1 is a conceptual diagram schematically illustrating an essential part of the whole structure of a steam turbine system according to a first embodiment.

FIG. 1 is a conceptual view schematically illustrating an essential part of the whole structure of a steam turbine system according to a first embodiment.

As illustrated in FIG. 1, the steam turbine system has a boiler 10, a high-pressure turbine 20, a reheater 30, an intermediate-pressure turbine 40, a low-pressure turbine 50, a condenser 60, and a power generator 70.

In the steam turbine system, between the boiler 10 and the high-pressure turbine 20, a main steam pipe P10 is provided, and in the main steam pipe P10, a main steam stop valve V10a and a steam control valve V10b are installed. Between the high-pressure turbine 20 and the reheater 30, a low-temperature reheat steam pipe P20 is provided. Between the reheater 30 and the intermediate-pressure turbine 40, a high-temperature reheat steam pipe P30 is provided, and in the high-temperature reheat steam pipe P30, a reheat steam stop valve V30a and an intercept valve V30b are installed. Between the intermediate-pressure turbine 40 and the low-pressure turbine 50, a cross-over pipe P40 is provided.

In the steam turbine system, steam generated in the boiler 10 flows in the main steam pipe P10 and flows into the high-pressure turbine 20 via the main steam stop valve V10a and the steam control valve V10b in sequence. Then, the steam discharged from the high-pressure turbine 20 flows in the low-temperature reheat steam pipe P20 and flows into the reheater 30. Then, the steam reheated in the reheater 30 flows in the high-temperature reheat steam pipe P30 and flows into the intermediate-pressure turbine 40 via the reheat steam stop valve V30a and the intercept valve V30b in sequence. Then, the steam discharged from the intermediate-pressure turbine 40 flows in the cross-over pipe P40 and flows into the low-pressure turbine 50. Thereafter, the steam is condensed (condensed to water) in the condenser 60 and the condensed water, though not illustrated, is returned to the boiler 10.

In the steam turbine system, turbine rotors are coaxially coupled in the high-pressure turbine 20, the intermediate-pressure turbine 40, and the low-pressure turbine 50, and the steam flowing in these parts as a working fluid expands to do work, thereby rotating the turbine rotors. Then, the power generator 70 is driven by the rotation of the turbine rotors to generate power.

As illustrated in FIG. 1, the steam turbine system has a control part 100 (steam turbine control device) in addition to the above-described parts.

The control part 100 controls the operation of each part. For example, the control part 100 is a steam valve control device which controls the steam control valve V10b (steam valve), and adjusts a flow rate of the steam flowing into an inlet of the steam turbine constituted by the high-pressure turbine 20, the intermediate-pressure turbine 40, and the low-pressure turbine 50. The control part 100 receives a signal of an actual rotational speed detected by a turbine rotational speed detector 21 and controls the operation of the steam control valve V10b based on the actual rotational speed.

Figure 16:
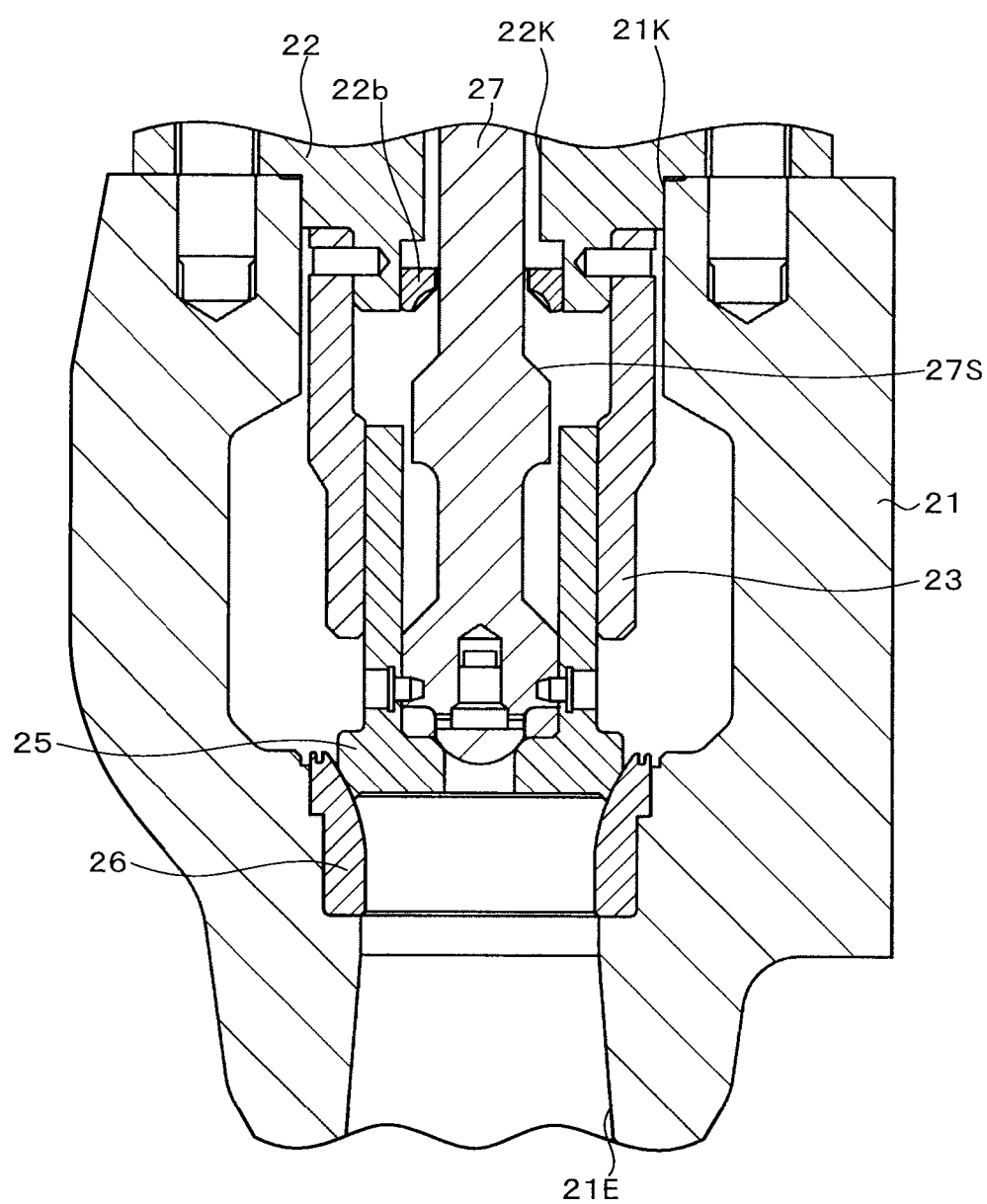
FIG. 16 is a cross-sectional view schematically illustrating an example of a steam valve.

Here, as the steam control valve 10b, four steam valves having the same structure as that of the aforesaid steam valve V10 illustrated in FIG. 16 are provided, for instance, and the control part 100 controls the four steam valves V10 by a "throttle governing method". That is, in this embodiment, in order to increase an amount of the steam supplied to the steam turbine, the control part 100 opens the four steam valves V10 simultaneously with the same opening degree.

In this embodiment, when a "governor free operation" is performed, the control part 100 controls the operation of the plural steam valves V10 constituting the steam control valve V10$b$ by setting a limited opening degree limited to be smaller than the maximum opening degree as an upper limit.

On the other hand, when a "load limiter operation" is performed, the control part 100 controls the operation of the plural steam valves V10 by setting the maximum opening degree as the upper limit.

[A-2] Regarding Details of the Control Part 100 (Steam Turbine Control Device)

Figure 2:
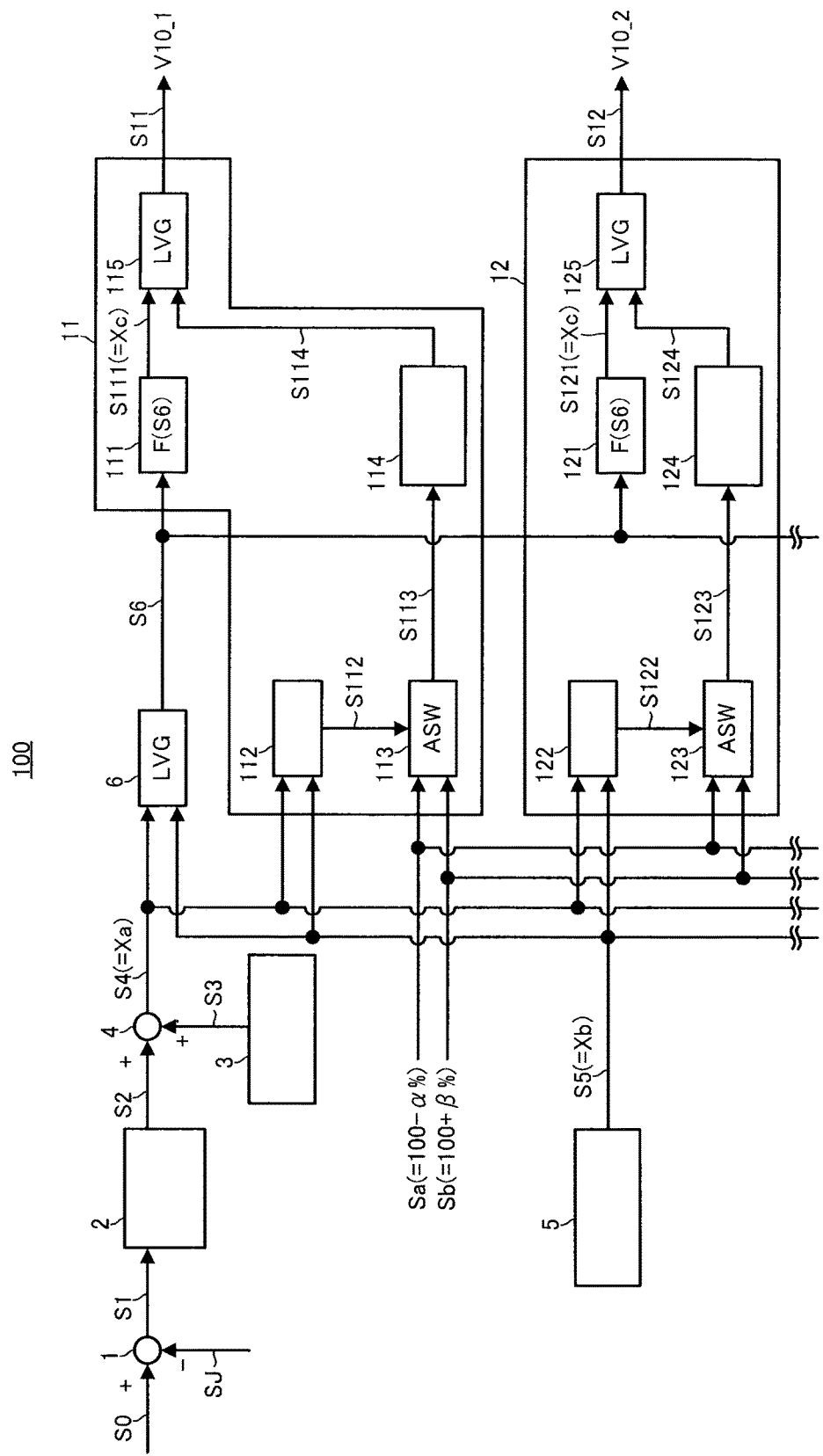
FIG. 2 is a diagram schematically illustrating an essential part of a detailed structure of a control part according to the first embodiment.
Figure 3:
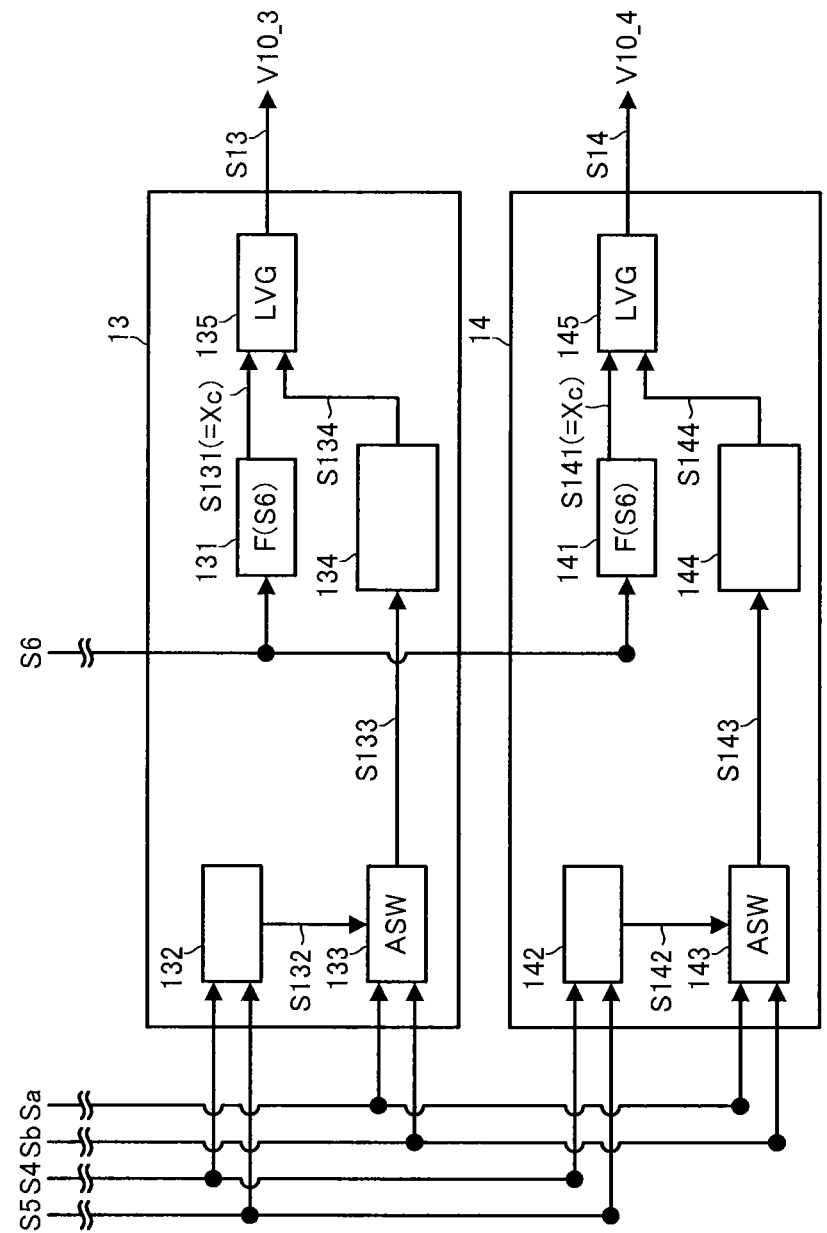
FIG. 3 is a diagram schematically illustrating an essential part of the detailed structure of the control part according to the first embodiment.

FIG. 2 and FIG. 3 are diagrams schematically illustrating essential parts of a detailed structure of the control part 100 according to the first embodiment. Here, the detailed structure of the control part 100 is separately illustrated in FIG. 2 and FIG. 3.

As illustrated in FIG. 2, the control part 100 has a deviation arithmetic unit 1, a speed regulation rate unit 2, a load setter 3, an adder 4, a load limiter 5, and a lower-value preference circuit 6 (LVG).

Besides, in this embodiment, the control part 100 has a first valve control part 11, a second valve control part 12, a third valve control part 13, and a fourth valve control part 14 as illustrated in FIG. 2 and FIG. 3.

Here, the first valve control part 11 includes a function generator 111, a comparator 112, a switch circuit 113 (ASW), a change rate limiter 114, and a lower-value preference circuit 115. The first valve control part 11 outputs an opening degree instruction signal S11 to a first steam valve V10_1 out of the plural steam valves V10 provided as the steam control valve V10$b$.

Similarly, the second valve control part 12, the third valve control part 13, and the fourth valve control part 14 include function generators 121, 131, 141, comparators 122, 132, 142, switch circuits 123, 133, 143, change rate limiters 124, 134, 144, and lower-value preference circuits 125, 135, 145 respectively. The second valve control part 12, the third valve control part 13, and the fourth valve control part 14 output opening degree instruction signals S12, S13, S14 to a second steam valve V10_2, a third steam valve V10_3, and a fourth steam valve V10_4 respectively out of the plural steam valves V10 provided as the steam control valve V10$b$.

In the control part 100, each part is constituted by an arithmetic unit. After arithmetic processing is executed in each part, the control part 100 outputs the opening degree instruction signals S11, S12, S13, S14 obtained by the arithmetic processing to the plural steam valves V10_1 to 4 (steam control valve V10$b$) respectively to adjust a flow rate of the steam supplied to the high-pressure turbine 20 (refer to FIG. 1).

The parts constituting the control part 100 will be described in sequence.

[A-2-1] The Deviation Arithmetic Unit 1

The deviation arithmetic unit 1 calculates a deviation between a rotational speed setting signal S0 and an actual rotational speed signal SJ as illustrated in FIG. 2. Concretely, the deviation arithmetic unit 1 finds a difference value between a value of the rotational speed setting signal S0 corresponding to a set target rotational speed of the turbine and a value of the actual rotational speed signal SJ that the turbine rotational speed detector 21 (refer to FIG. 1) obtains by actually measuring a rotational speed of the turbine rotor.

Then, the deviation arithmetic unit 1 outputs the found deviation value as an output signal S1 to the speed regulation rate unit 2.

[A-2-2] The Speed Regulation Rate Unit 2

The speed regulation rate unit 2 multiplies the output signal S1 output by the deviation arithmetic unit 1 by a gain (1/k), as illustrated in FIG. 2. That is, the speed regulation rate unit 2 performs arithmetic processing of multiplying the value of the output signal S1 of the deviation arithmetic unit 1 by a reciprocal of a speed regulation rate k. The speed regulation rate k is a value set in advance and is, for example, 5%, and in this case, the output signal S1 output from the deviation arithmetic unit 1 becomes twenty times (=1/0.05).

Then, the speed regulation rate unit 2 outputs a value obtained by the above processing as an output signal S2 (=S1/k) to the adder 4.

[A-2-3] The Load Setter 3

As illustrated in FIG. 2, the load setter 3 outputs a load setting signal S3 corresponding to a set load setting value of the turbine as an output signal to the adder 4.

[A-2-4] The Adder 4

As illustrated in FIG. 2, the adder 4 executes addition processing of the output signal S2 output by the speed regulation rate unit 2 and the load setting signal S3 output by the load setter 3 to find a load request signal S4 (=S2+S3=Xa).

Then, the adder 4 outputs the load request signal S4 (=Xa) to the lower-value preference circuit 6.

[A-2-5] The Load Limiter 5

As illustrated in FIG. 2, the load limiter 5 outputs a load limit signal S5 (=Xb) corresponding to a load limit value of the turbine to the lower-value preference circuit 6.

[A-2-6] the Lower-Value Preference Circuit 6

As illustrated in FIG. 2, the lower-value preference circuit 6 selects the lower value of the load request signal S4 (=Xa) output by the adder 4 and the load limit signal S5 (=Xb) output by the load limiter 5.

Here, when the "governor free operation" is performed, the load request signal S4 (=Xa) is equal to or less than the load limit signal S5 (=Xb) (S4≤S5 (that is, Xa≤Xb)). Therefore, in this case, the load request signal S4 (=Xa) is selected.

On the other hand, when the "load limiter operation" is performed, the load request signal S4 (=Xa) is larger than the load limit signal S5 (=Xb) (S4>S5 (Xa>Xb)). Therefore, in this case, the load limit signal S5 (=Xb) is selected.

Then, the lower-value preference circuit 6 outputs the selected signal as an output signal S6 (=S4 or S5 (=Xa or Xb)) to the function generators 111, 121, 131, 141 of the respective first valve control part 11, second valve control part 12, third valve control part 13, and fourth valve control part 14.

[A-2-7] The First Valve Control Part 11

[A-2-7-1] The Function Generator 111

The output signal S6 (S4 or S5) output by the lower-value preference circuit 6 is input to the function generator 111 in the first valve control part 11. Then, the function generator 111 outputs an opening degree instruction signal S111 (=Xc) based on the output signal S6 output by the lower-value preference circuit 6.

Concretely, the function generator 111 finds the opening degree instruction signal S111 (=Xc=F(S6)) corresponding to the output signal S6 by using a function F(S6) set in relation to the output signal S6 of the lower-value preference circuit 6. Then, it outputs the found opening degree instruction signal S111 (=Xc) to the lower-value preference circuit 115.

Figure 4:
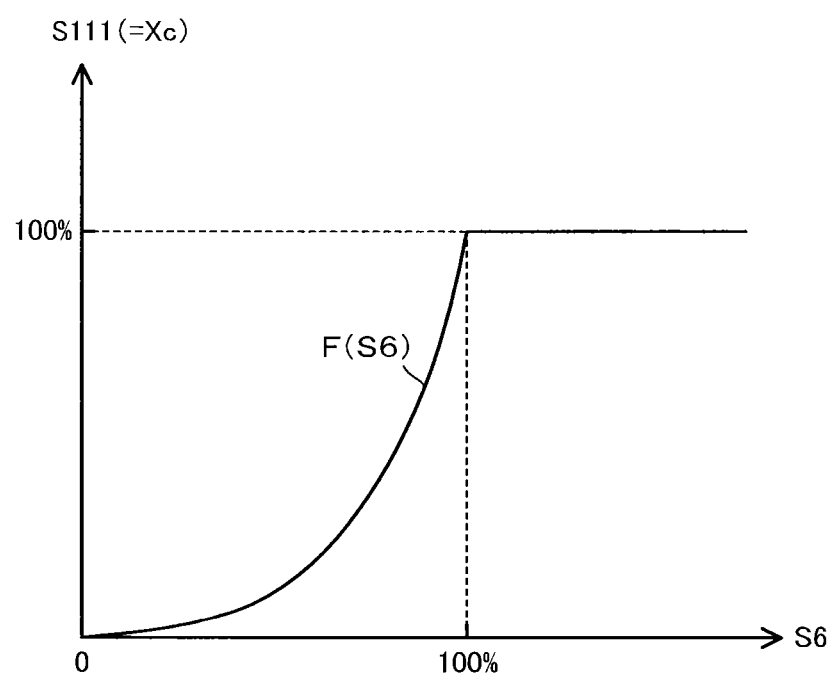
FIG. 4 is a chart illustrating a function used in a function generator in the steam turbine system according to the first embodiment.

FIG. 4 is a chart illustrating the function F(S6) used in the function generator 111 in the steam turbine system according to the first embodiment.

In FIG. 4, the horizontal axis represents a signal value of the output signal S6 output by the lower-value preference circuit 6 and the vertical axis represents a signal value of the opening degree instruction signal S111 (=Xc) output by the function generator 111.

As illustrated in FIG. 4, the function F(S6) is set so that the signal value of the opening degree instruction signal S111 (=Xc) becomes larger in accordance with an increase of the signal value of the output signal S6 output by the lower-value preference circuit 6 during a period when the signal value of the output signal S6 is 0 to 100%. Here, the function F(S6) is not set so that the opening degree instruction signal S111 (=Xc) increases at a constant rate according to the output signal S6 of the lower-value preference circuit 6, but is set so that a rate of the increase of the opening degree instruction signal S111 (=Xc) increases according to the output signal S6.

Then, the function F(S6) is set so that the signal value of the opening degree instruction signal S111 (=Xc) becomes a constant 100% value when the signal value of the output signal S6 output by the lower-value preference circuit 6 exceeds 100%, irrespective of the signal value of the output signal S6.

[A-2-7-2] The Comparator 112

The load request signal S4 (=Xa) output by the adder 4 and the load limit signal S5 (=Xb) output by the load limiter 5 are input to the comparator 112 in the first valve control part 11.

Then, the comparator 112 performs comparison processing of the load request signal S4 (=Xa) and the load limit signal S5 (=Xb), and based on the result of the comparison processing, outputs an output signal S112.

Concretely, when the "governor free operation" is performed, the value of the load request signal S4 (=Xa) is equal to or lower than the value of the load limit signal S5 (=Xb) (S4≤S5 (that is, Xa≤Xb)) as described above. In this case, the comparator 112 outputs a signal whose signal value is 0 (Low signal) as the output signal S112 to the switch circuit 113.

On the other hand, when the "load limiter operation" is performed, the value of the load request signal S4 (=Xa) is larger than the value of the load limit signal S5 (=Xb) (S4>S5 (that is, Xa>Xb)) as described above. In this case, the comparator 112 outputs a signal whose signal value is 1 (High signal) as the output signal S112 to the switch circuit 113.

[A-2-7-4] The Switch Circuit 113

In the first valve control part 11, the output signal S112 output by the comparator 112 is input to the switch circuit 113. Besides, an opening degree instruction signal Sa indicating a 100−α% opening degree (for example, α=5% to 10%) and an opening degree instruction signal Sb indicating a 100+β% opening degree (for example, β=5% to 15%) are input to the switch circuit 113.

Based on the output signal S112 output by the comparator 112, the switch circuit 113 changes between the opening degree instruction signal Sa indicating the 100−α% opening degree and the opening degree instruction signal Sb indicating the 100+β% opening degree to output the selected signal as an output signal S113 to the change rate limiter 114.

Concretely, when the "governor free operation" is performed, the output signal S112 whose signal value is 0 (Low signal) is output to the switch circuit 113 from the comparator 112 as described above. In this case, the switch circuit 113 outputs the opening degree instruction signal Sa indicating the 100−α% opening degree as the output signal S113 to the change rate limiter 114.

On the other hand, when the "load limiter operation" is performed, the output signal S112 whose signal value is 1 (High signal) is output to the switch circuit 113 from the comparator 112 as described above. In this case, the switch circuit 113 outputs the opening degree instruction signal Sb indicating the 100+β% opening degree as the output signal S113 to the change rate limiter 114.

[A-2-7-4] The Change Rate Limiter 114

In the first valve control part 11, the output signal S113 (Sa or Sb) (100−α% or 100+β%) output by the switch circuit 113 is input to the change rate limiter 114.

When the signal value of the output signal S113 output by the switch circuit 113 changes, the change rate limiter 114 changes the signal value at a constant rate within a predetermined time to output the resultant as an output signal S114.

Figure 5A:
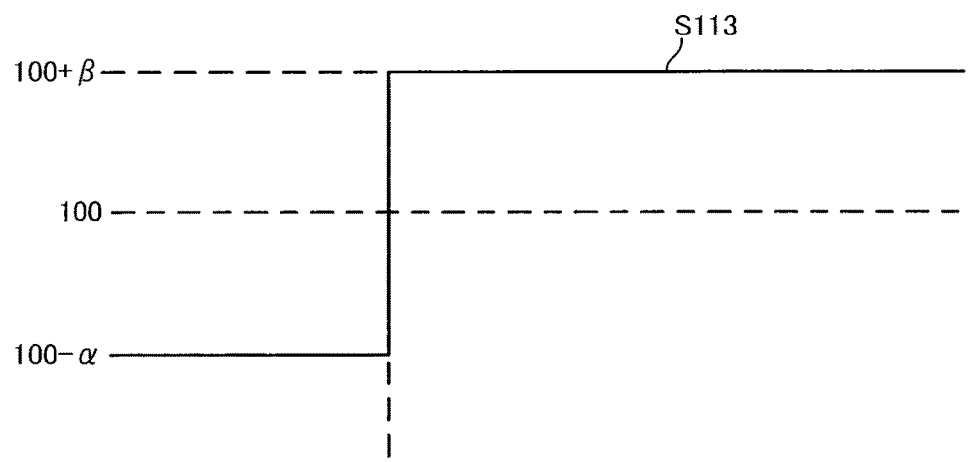
FIG. 5A and FIG. 5B are charts illustrating processing of a change rate limiter in the steam turbine system according to the first embodiment.
Figure 5B:
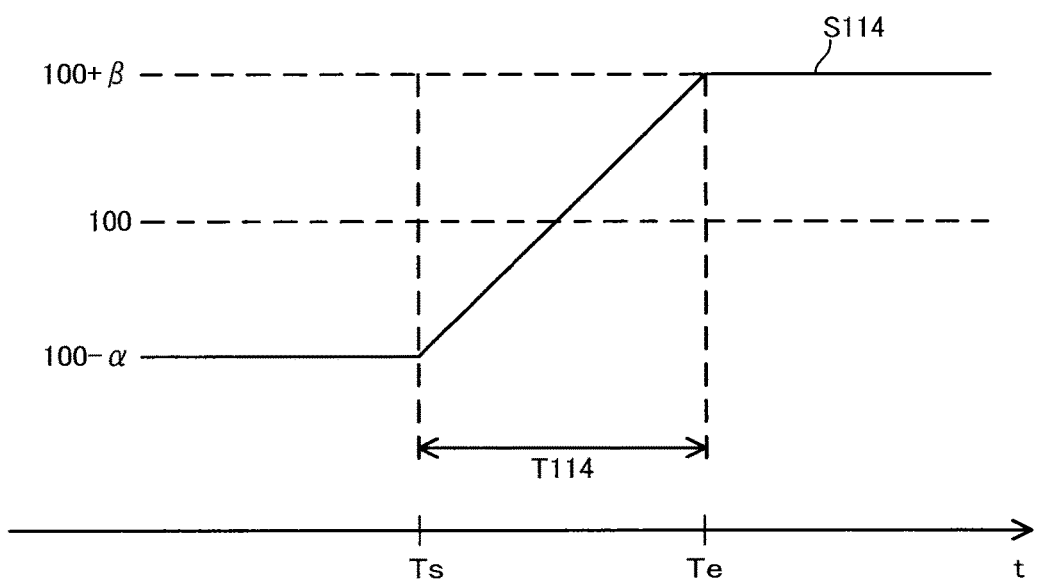

FIG. 5A and FIG. 5B are charts illustrating processing of the change rate limiter 114 in the steam turbine system according to the first embodiment.

In FIG. 5A and FIG. 5B, the horizontal axis represents time t and the vertical axis represents the opening degree (signal value). Further, FIG. 5A illustrates the output signal S113 output by the switch circuit 113 (the input signal of the change rate limiter 114) and FIG. 5B illustrates the output signal S114 output by the change rate limiter 114.

When the output signal S113 of the switch circuit 113 is changed from 100−α% to 100+β% as illustrated in FIG. 5A, the output signal S114 of the change rate limiter 114 is increased at the constant rate from 100−α% to 100+β% within a predetermined time T114 as illustrated in FIG. 5B. That is, the output signal S113 in a rectangular shape which is output from the switch circuit 113 is transformed into a ramp shape and the transformed signal is output as the output signal S114 of the change rate limiter 114.

Concretely, as illustrated in FIG. 5A and FIG. 5B, before an instant Ts when the output signal S113 of the switch circuit 113 is changed from 100−α% to 100+β%, the change rate limiter 114 outputs the 100−α% output signal S114. Then, after the change instant Ts, the change rate limiter 114 outputs the output signal S114 while increasing it from 100−α% to 100+β% at the constant rate within the preset time T114. Then, after the predetermined time T114, it outputs the 100+β% output signal S114.

When the output signal S113 of the switch circuit 113 is changed from 100+β% to 100−α%, the output signal S114 of the change rate limiter 114 is decreased at a predetermined rate from 100+β% to 100−α% within the preset time T114, though which case is not illustrated.

Incidentally, the time T114 during which the output signal S114 is changed is, for example, three seconds to five seconds but can be arbitrarily set.

[A-2-7-5] The Lower-Value Preference Circuit 115

In the first valve control part 11, the opening degree instruction signal S111 (=Xc) output by the function generator 111 and the output signal S114 (=Sa to Sb=100−α% to 100+β%) output by the change rate limiter 114 are input to the lower-value preference circuit 115 as illustrated in FIG. 2.

Then, the lower-value preference circuit 115 performs comparison processing of the opening degree instruction signal S111 (=Xc) output by the function generator 111 and the output signal S114 (=Sa to Sb) output by the change rate limiter 114 and selects the lower value of these to output the selected value as the opening degree instruction signal S11.

When the "governor free operation" is performed, a signal value of the output signal S114 output by the change rate limiter 114 is 100−α%. Therefore, an upper limit of a signal value of the opening degree instruction signal S11 output by the lower-value preference circuit 115 becomes 100−α%. Therefore, the opening degree of the first steam valve V10_1 is limited to 100−α%.

On the other hand, when the "load limiter operation" is performed, the signal value of the output signal S114 output by the change rate limiter 114 is 100+β%. Therefore, the upper limit of the signal value of the opening degree instruction signal S11 output by the lower-value preference circuit 115 becomes 100+β%. Therefore, the opening degree of the first steam valve V10_1 is not limited.

As described above, in this embodiment, when the "load limiter operation" is performed, the first steam valve V10_1 is controlled, with the maximum opening degree being set as the upper limit. Then, when the "governor free operation" is performed, the first steam valve V10_1 is controlled, with the limited opening degree (100−α%) limited to be smaller than the maximum opening degree being set as the upper limit.

[A-2-8] The Second Valve Control Part 12, the Third Valve Control Part 13, and the Fourth Valve Control Part 14

The second valve control part 12, the third valve control part 13, and the fourth valve control part 14 are structured similarly to the first valve control part 11 as illustrated in FIG. 2 and FIG. 3.

The second valve control part 12, similarly to the first valve control part 11, performs arithmetic processing in each part to output the opening degree instruction signal S12 to the second steam valve V10_2.

The third valve control part 13, similarly to the first valve control part 11, performs arithmetic processing in each part to output the opening degree instruction signal S13 to the third steam valve V10_3.

The fourth valve control part 14, similarly to the first valve control part 11, performs arithmetic processing in each part to output the opening degree instruction signal S14 to the fourth steam valve V10_4.

Consequently, in this embodiment, when the "load limiter operation" is performed, the second steam valve V10_2, the third steam valve V10_3, and the fourth steam valve V10_4, similarly to the first steam valve V10_1, are controlled, with the maximum opening degree being set as the upper limit. When the "governor free operation" is performed, the second steam valve V10_2, the third steam valve V10_3, and the fourth steam valve V10_4, similarly to the first steam valve V10_1, are controlled, with the limited opening degree (100−α%) limited to be smaller than the maximum opening degree being set as the upper limit.

In this embodiment, since the operation by the "throttle governing method" is presented, the second steam valve V10_2, the third steam valve V10_3, and the fourth steam valve V_4 are controlled so as to have the same opening degree as that of the first steam valve V10_1 simultaneously.

[B] Operation

The operation of the above-described steam turbine system will be described.

Here, regarding the operation of the control part 100 when the steam turbine is operated by the "throttle governing method", the case of the "governor free operation" and the case of the "load limiter operation" will be described separately.

[B-1] Case of the "Governor Free Operation"

In the case of the "governor free operation", the load request signal S4 (=Xa) is equal to or less than the load limit signal S5 (=Xb) (S4≤S5 (that is, Xa≤Xb)) as described above. Therefore, in the lower-value preference circuit 6, the load request signal S4 (=Xa) is selected and is output as the output signal S6 from the lower-value preference circuit 6 to the first valve control part 11, the second valve control part 12, the third valve control part 13, and the fourth valve control part 14 (refer to FIG. 2 and FIG. 3).

In the first valve control part 11, the output signal S6 (=Xa) of the lower-value preference circuit 6 is input to the function generator 111 as illustrated in FIG. 2. The function generator 111 finds the opening degree instruction signal S111 (=Xc=F(Xa)) corresponding to the output signal S6 (=Xa) of the lower-value preference circuit 6 by using the function F(S6) to output the found opening degree instruction signal S111 to the lower-value preference circuit 115.

In the first valve control part 11, besides the above, the load request signal S4 (=Xa) and the load limit signal S5 (=Xb) are input to the comparator 112 as illustrated in FIG. 2. Then, the comparison processing is performed in the comparator 112, and based on the result of the comparison processing, the output signal S112 is output from the comparator 112. Here, since the "governor free operation" is performed, the value of the load request signal S4 (=Xa) is equal to or less than the value of the load limit signal S5 (=Xb) (S4≤S5 (Xa≤Xb)). Therefore, in this case, the output signal S112 whose signal value is 0 (Low signal) is output from the comparator 112 to the switch circuit 113.

When the output signal S112 of the comparator 112 has the 0 signal value (Low signal), the switch circuit 113 outputs the opening degree instruction signal Sa whose signal value is 100−α% as the output signal S113 to the change rate limiter 114. Then, according to the output signal S113 of the switch circuit 113, the change rate limiter 114 outputs the output signal S114 to the lower-value preference circuit 115. Here, unless the output signal S113 of the switch circuit 113 is changed between 100−α% and 100+β%, the signal having the same signal value as that of the output signal S113 of the switch circuit 113 is output as the output signal S114 (=Sa=100−α%) from the change rate limiter 114.

Then, the lower-value preference circuit 115 performs the comparison processing of comparing the opening degree instruction signal S111 (=Xc=F(Xa)) output by the function generator 111 and the output signal S114 (=Sa=100−α%) of the change rate limiter 114. Then, the lower value of the both is output as the opening degree instruction signal S11 from the lower-value preference circuit 115 to the first steam valve V10_1. Therefore, the upper limit of the signal value of the opening degree instruction signal S11 output by the lower-value preference circuit 115 becomes 100−α%. Therefore, the opening degree of the first steam valve V10_1 is limited to 100−α%.

In the second valve control part 12, the third valve control part 13, and the fourth valve control part 14, the arithmetic processing is also performed as in the case of the first valve control part 11. Then, the opening degree instruction signals S12, S13, S14 are output to the second steam valve V10_2, the third steam valve V10_3, and the fourth steam valve V10_4 respectively (refer to FIG. 2 and FIG. 3).

Therefore, similarly to the above, upper limits of signal values of the opening degree instruction signals S12, S13, S14 output by the second valve control part 12, the third valve control part 13, and the fourth valve control part 14 also become 100−α%. Therefore, the opening degrees of the second steam valve V10_2, the third steam valve V10_3, and the fourth steam valve V10_4 are limited to 100−α% as in the case of the first steam valve V10_1.

Figure 6:
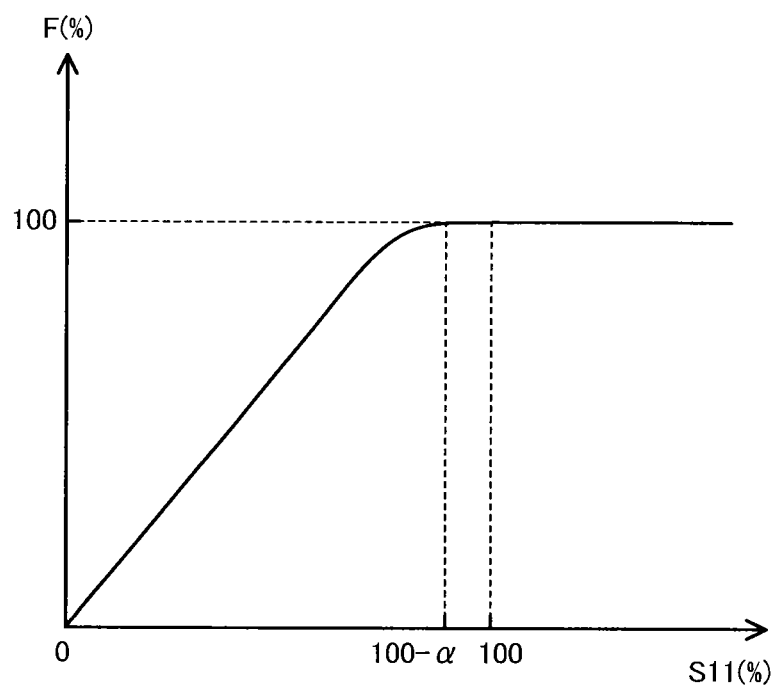
FIG. 6 is a chart illustrating a relation between an opening degree instruction signal and a steam flow rate in the steam turbine system according to the first embodiment.

FIG. 6 is a chart illustrating a relation between the opening degree instruction signal S11 (S12, S13, S14) and a steam flow rate in the steam turbine system according to the first embodiment.

In FIG. 6, the horizontal axis represents the signal value of the opening degree instruction signal S11 (S12, S13, S14) and the vertical axis represents the flow rate F of the steam flowing in the plural steam valves V10 (V10_1 to 4).

As illustrated in FIG. 6, the flow rate F of the steam flowing in the steam valve V10 increases as the signal value of the opening degree instruction signal S11 increases.

Here, in a part where the signal value of the opening degree instruction signal S11 is from 0% to a value slightly smaller than 100−α%, the steam flow rate F increases in proportion to the signal value of the opening degree instruction signal S11. That is, in this part, a rate of the increase of the steam flow rate F according to the opening degree signal instruction S11 is constant and is linear (straight line).

On the other hand, in a part where the signal value of the opening degree instruction signal S11 is from the vicinity of 100−α% to 100%, the proportional relation does not hold between the opening degree instruction signal S11 and the steam flow rate F. In this part, a rate of the increase of the steam flow rate F is smaller than in the part where the signal value of the opening degree instruction signal S11 is from 0% to the value slightly smaller than 100−α%. Further, in this part, the rate of the increase of the steam flow rate F decreases in accordance with the increase of the opening degree instruction signal S11, and the steam flow rate F is approximately constant.

Therefore, in the case of the "governor free operation", even if the opening degree of the steam valve V10 is limited to 100−α%, the steam flow rate F changes little.

[B-2] Case of the "Load Limiter Operation"

In the case of the "load limiter operation", the load request signal S4 (=Xa) is larger than the load limit signal S5 (=Xb) (S4>S5 (that is, Xa>Xb)) as described above. Therefore, in the lower-value preference circuit 6, the load limit signal S5 (=Xb) is selected, and the selected load limit signal S5 (=Xb) is output as the output signal S6 from the lower-value preference circuit 6 to the first valve control part 11, the second valve control part 12, the third valve control part 13, and the fourth valve control part 14 (refer to FIG. 2 and FIG. 3).

Then, in the first valve control part 11, the output signal S6 (=Xb) of the lower-value preference circuit 6 is input to the function generator 111 as illustrated in FIG. 2. In the function generator 111, by using the function F(S6), the opening degree instruction signal S111 (Xc=F(Xb)) corresponding to the output signal S6 (=Xb) of the lower-value preference circuit 6 is found and is output to the lower-value preference circuit 115.

In the first valve control part 11, besides the above, the load request signal S4 (=Xa) and the load limit signal S5 (=Xb) are input to the comparator 112 as illustrated in FIG. 2. Then, the comparison processing is performed in the comparator 112, and based on the result of the comparison processing, the comparator 112 outputs the output signal S112. Here, since the "load limiter operation" is performed, the value of the load request signal S4 (=Xa) is larger than the value of the load limit signal S5 (=Xb) (S4>S5 (Xa>Xb)). Therefore, in this case, the comparator 112 outputs the output signal S112 whose signal value is 1 (High signal) to the switch circuit 113.

When the signal value of the output signal S112 output by the comparator 112 is 1 (High signal), the switch circuit 113 outputs the 100+β% opening degree instruction signal Sb as the output signal S113 to the change rate limiter 114. Thereafter, the change rate limiter 114 outputs the output signal S114 (=Sb=100+β%) to the lower-value preference circuit 115.

Then, as illustrated in FIG. 2, in the lower-value preference circuit 115, the comparison processing of comparing the opening degree instruction signal S111 (=Xc=F(Xb)) output by the function generator 111 and the output signal S114 (=Sb=100+β%) output by the change rate limiter 114 is performed. Then, the lower value of the both is output as the opening degree instruction signal S11 to the first steam valve V10_1.

Therefore, the upper limit of the signal value of the opening degree instruction signal S11 output by the lower-value preference circuit 115 becomes 100+β%. Therefore, the first steam valve V10_1 is opened to the maximum opening degree.

As in the case of the first valve control part 11, in the second valve control part 12, the third valve control part 13, and the fourth valve control part 14, the arithmetic processing is performed and the opening degree instruction signals S12, S13, S14 are output to the second steam valve V10_2, the third steam valve V10_3, and the fourth steam valve V10_4 respectively (refer to FIG. 2 and FIG. 3). The upper limits of the signal values of the opening degree instruction signals S12, S13, S14 output by the second valve control part 12, the third valve control part 13, and the fourth valve control part 14 respectively also become 100+β% similarly to the above. Therefore, the second steam valve V10_2, the third steam valve V10_3, and the fourth steam valve V10_4 are opened to the maximum opening degree similarly to the first steam valve V10_1.

[C] Summary

As described above, in the steam turbine system of this embodiment, the high-pressure turbine 20, the intermediate-pressure turbine 40, and the low-pressure turbine 50 are installed as the steam turbine. Further, in the steam turbine system, the plural steam valves V10_1 to 4 are installed as the steam control valve V10b which adjusts the flow rate of the steam flowing into the inlet of the steam turbine. Further, the control part 100 (steam valve control device) which controls the plural steam valves V10_1 to 4 is provided (refer to FIG. 1).

The control part 100 outputs the opening degree instruction signals S11, S12, S13, S14 to the plural steam valves V10_1 to 4 respectively according to the output signal S6 (=load request signal Xa) of the lower-value preference circuit 6 and so on (refer to FIG. 2 and FIG. 3), thereby operating the steam turbine by the "throttle governing method". That is, the control part 100 controls the plural steam valves V10_1 to 4 so that their opening degrees become equal simultaneously.

In this embodiment, when the "governor free operation" is performed, in order to prevent the bush 22b and the contact surface 27s of the valve rod 27 from repeatedly coming into mechanical contact with each other (refer to FIG. 16), the control part 100 controls the plural steam valves V10_1 to 4 by setting the limited opening degree (100−α%) limited to be smaller than the maximum opening degree (100%) as the upper limit.

Thus, in this embodiment, when the "governor free operation" is performed, a state where a predetermined clearance exists between the valve rod 27 and the upper cover 22 is maintained in each of the plural steam valves V10_1 to 4 (refer to FIG. 16). Therefore, in this embodiment, when the "governor free operation" is performed, the system frequency changes while the plural steam valves V10_1 to 4 are in a full open state, and even when the opening degree instruction signal periodically changes, it is possible to prevent the repeated contact of the valve rod 27 with the upper cover 22. As a result, it is possible to prevent the occurrence of cracks in the plural steam valves V10_1 to 4 due to fatigue failure.

On the other hand, when the "load limiter operation" is performed, the control part 100 does not limit the opening degrees of the plural steam valves V10_1 to 4 and performs the control by setting the maximum opening degree (100%) as the upper limit. By opening the plural steam valves V10_1 to 4 up to the maximum opening degree (full open), it is possible to keep the contact state of the valve rod 27 with the upper cover 22 and prevent the steam from leaking from the gap between the valve rod 27 and the upper cover 22 (refer to FIG. 16). As a result, performance of the turbine can be improved.

In this embodiment, when a change between the "governor free operation" and the "load limiter operation" takes place, the control part 100 controls the plural steam valves V10_1 to 4 so that the opening degree changes at a constant rate between the limited opening degree (100−α%) and the maximum opening degree (100%). Therefore, in this embodiment, it is possible to prevent a great change in the opening degrees of the plural steam valves V10_1 to 4.

Therefore, in this embodiment, it is possible to safely operate the steam turbine.

Second Embodiment

[A] Structure

Figure 7:
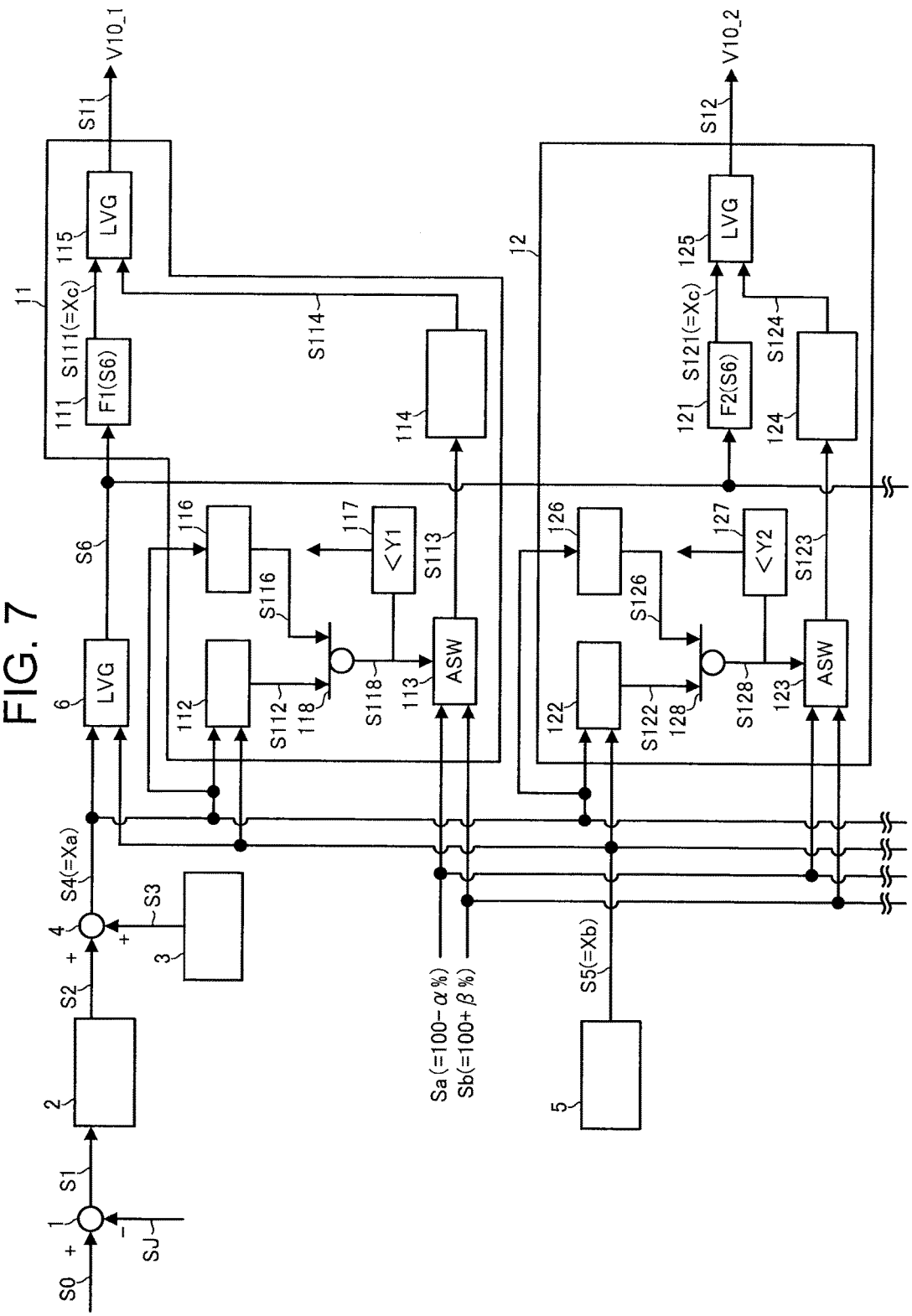
FIG. 7 is a diagram schematically illustrating an essential part of a control part in a steam turbine system according to a second embodiment.
Figure 8:
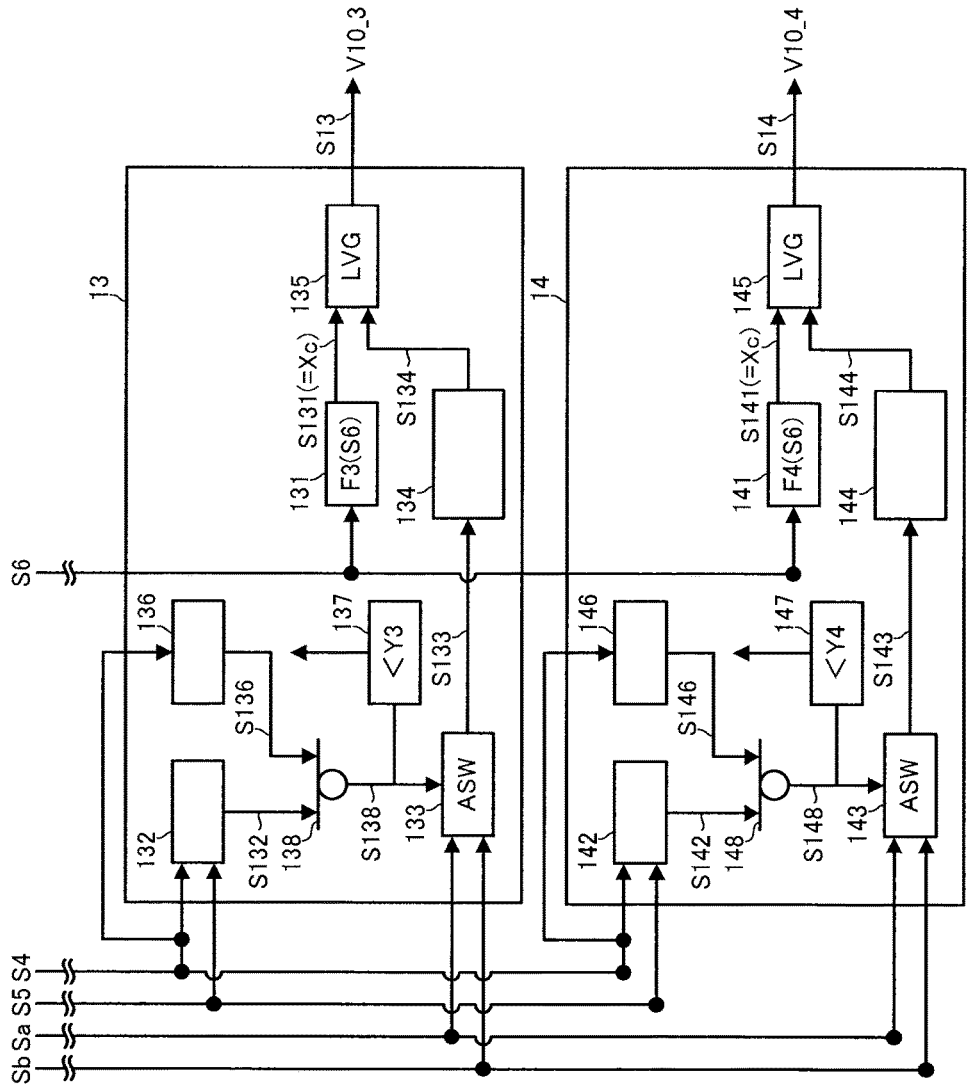
FIG. 8 is a diagram schematically illustrating an essential part of the control part in the steam turbine system according to the second embodiment.

FIG. 7 and FIG. 8 are diagrams schematically illustrating essential parts of a control part 100 in a steam turbine system according to a second embodiment. Here, as in the case of FIG. 2 and FIG. 3, a detailed structure of the control part 100 is separately illustrated in FIG. 7 and FIG. 8.

In this embodiment, as illustrated in FIG. 7 and FIG. 8, in the control part 100, the structure of each of a first valve control part 11, a second valve control part 12, a third valve control part 13, and a fourth valve control part 14 is partly different from that in the first embodiment. Further, the control part 100 performs the control so that the operation is performed by a "nozzle governing method" instead of the "throttle governing method". This embodiment is the same as the first embodiment except in this point and related points. Therefore, in this embodiment, the description of what are the same as those of first embodiment will be omitted when appropriate.

In the control part 100, the first valve control part 11 includes, as in the case of the first embodiment, a function generator 111, a comparator 112 (first comparator), a switch circuit 113, a change rate limiter 114, and a lower-value preference circuit 115 as illustrated in FIG. 7. Besides, the first valve control part 11 further has a comparator 116 (second comparator), a cancelling circuit 117, and an OR circuit 118 (logical sum circuit), as is not the case in the first embodiment.

Similarly, the second valve control part 12, the third valve control part 13, and the fourth valve control part 14 include, as in the case of the first embodiment, function generators 121, 131, 141, comparators 122, 132, 142, switch circuits 123, 133, 143, change rate limiter 124, 134, 144, and lower-value preference circuits 125, 135, 145 respectively as illustrated in FIG. 7 and FIG. 8. Besides, the second valve control part 12, the third valve control part 13, and the fourth valve control part 14 further have, similarly to the first valve control part 11, comparators 126, 136, 146, cancelling circuits 127, 137, 147, and OR circuits 128, 138, 148 respectively, as is not the case in the first embodiment.

Further, as described above, the control part 100 operates a steam turbine by the "nozzle governing method", as is not the case in the first embodiment. That is, when increasing an amount of steam supplied to the steam turbine, the control part 100 starts to open a first steam valve V10_1, a second steam valve V10_2, a third steam valve V10_3, and a fourth steam valve V10_3 in the order mentioned and controls each part so as to fully open the valves.

In this case, when a "governor free operation" is performed, the control part 100 controls a valve whose opening degree is adjusted for speed governing, out of the plural steam valves V10_1 to 4, by setting a limited opening degree (100−α%) limited to be smaller than the maximum opening degree (100%) as an upper limit.

On the other hand, when a "load limiter operation" is performed, the control part 100 does not limit the opening degrees of the plural steam valves V10_1 to 4 and performs the control by setting the maximum opening degree as the upper limit.

Details of the parts constituting the control part 100 will be described in sequence.

[A-1] The First Valve Control Part 11

[A-1-1] The Comparator 116 (Second Comparator)

In the first valve control part 11, a load request signal S4 (=Xa) output by an adder 4 is input to the comparator 116 as illustrated in FIG. 7.

Then, the comparator 116 performs comparison processing of comparing the input load request signal S4 and a preset threshold value THb (=Y1+α1). Then, the comparator 116 outputs an output signal S116 to the OR circuit 118 according to the result of the comparison processing.

Concretely, when a value of the load request signal S4 (=Xa) is equal to or less than the preset threshold value THb (=Y1+α1) (S4≤THb), the comparator 116 outputs a signal whose signal value is 0 (Low signal) as the output signal S116.

On the other hand, when the value of the load request signal S4 (=Xa) is larger than the threshold value THb (=Y1+α1) (S4>THb), the comparator 116 outputs a signal whose signal value is 1 (High signal) as the output signal S116.

[A-1-2] The Cancelling Circuit 117

When the comparator 116 (second comparator) outputs the output signal S116 whose signal value is 1 (High signal), the cancelling circuit 117 holds the output signal S116 whose signal value is 1, and when the value of the load request signal S4 (=Xa) decreases to be equal to or less than a threshold value THa (=Y1) (Xa≤Y1), the cancelling circuit 117 cancels the output signal S116 whose signal value is 1 (High signal).

Then, in this case, the cancelling circuit 117 sets the signal value of the output signal S116 output by the comparator 116 (second comparator) to 0 (Low signal).

[A-1-3] The OR Circuit 118

As illustrated in FIG. 7, an output signal S112 of the comparator 112 (first comparator) and the output signal S116 of the comparator 116 (second comparator) are input to the OR circuit 118. Then, the OR circuit 118 performs logical sum operation processing to output the operation result as an output signal S118.

Concretely, when the "governor free operation" is performed, the output signal S112 whose signal value is 0 (Low signal) is output from the comparator 112 (first comparator) to be input to the OR circuit 118. On the other hand, when the "load limiter operation" is performed, the output signal S112 whose signal value is 1 (High signal) is output from the comparator 112 (first comparator) to be input to the OR circuit 118.

As described above, when the value of the load request signal S4 (=Xa) is equal to or less than the threshold value THb (S4≤THb), the output signal S116 whose signal value is 0 (Low signal) is output from the comparator 116 (second comparator) to be input to the OR circuit 118. On the other hand, when the value of the load request signal S4 (=Xa) is larger than the threshold value THb (S4>THb), the output signal S116 whose signal value is 1 (High signal) is output from the comparator 116 (second comparator) to be input to the OR circuit 118.

Then, when at least one of the output signal S112 of the comparator 112 (first comparator) and the output signal S116 of the comparator 116 (second comparator) is the signal whose signal value is 1 (High signal), the OR circuit 118 outputs the output signal S118 whose signal value is 1 (High signal).

On the other hand, when both of the output signal S112 of the comparator 112 (first comparator) and the output signal S116 of the comparator 116 (second comparator) are the signals whose signal values are 0 (Low signals), the OR circuit 118 outputs the output signal S118 whose signal value is 0 (Low signal).

The output signal S118 of the OR circuit 118 is input to the switch circuit 113. Then, in the switch circuit 113, based on the output signal S118 of the OR circuit 118, an output signal S113 is output to the change rate limiter 114. Then, as in the case of the first embodiment, an output signal of the change rate limiter 114 is input to the lower-value preference circuit 115. Thereafter, in the lower-value preference circuit 115, the lower value of values of an opening degree instruction signal S111 (=Xc) output by the function generator 111 and an output signal S114 output by the change rate limiter 114 is selected, and the selected value is output as an opening degree instruction signal S11. Then, the first steam valve V10_1 operates based on the opening degree instruction signal S11.

[A-2] The Second Valve Control Part 12, the Third Valve Control Part 13, and the Fourth Valve Control Part 14

The second valve control part 12, the third valve control part 13, and the fourth valve control part 14 are structured similarly to the first valve control part 11 as illustrated in FIG. 7 and FIG. 8.

The second valve control part 12, similarly to the first valve control part 11, performs arithmetic processing in each part to output an opening degree instruction signal S12 to the second steam valve V10_2. Then, the second steam valve V10_2 operates based on the opening degree instruction signal S12.

The third valve control part 13, similarly to the first valve control part 11, performs arithmetic processing in each part to output an opening degree instruction signal S13 to the third steam valve V10_3. Then, the third steam valve V10_3 operates based on the opening degree instruction signal S13.

The fourth valve control part 14, similarly to the first valve control part 11, performs arithmetic processing in each part to output an opening degree instruction signal S14 to the fourth steam valve V10_4. Then, the fourth steam valve V10_4 operates based on the opening degree instruction signal S14.

In this embodiment, the operation is performed by the "nozzle governing method" as described above. Therefore, in order to increase a steam amount supplied to an inlet of the steam turbine, the first steam valve V10_1 starts to open, and thereafter the second steam valve V10_2, the third steam valve V10_3, and the fourth steam valve V10_4 start to open in the order mentioned according to the opening degree instruction signals S12, S13, S14. Further, after the first steam valve V10_1 comes to have the maximum opening degree (is fully opened), the second steam valve V10_2, the third steam valve V10_3, and the fourth steam valve V10_4 come to have the maximum opening degree (are fully opened) in the order mentioned.

[A-3] Regarding the Signals of the Control Part 100

FIG. 9A, FIG. 9B, FIG. 10A, FIG. 10B, FIG. 11A, FIG. 11B, FIG. 12A, and FIG. 12B are charts illustrating the signals of the control part 100 in the steam turbine system according to the second embodiment.

Figure 9A:
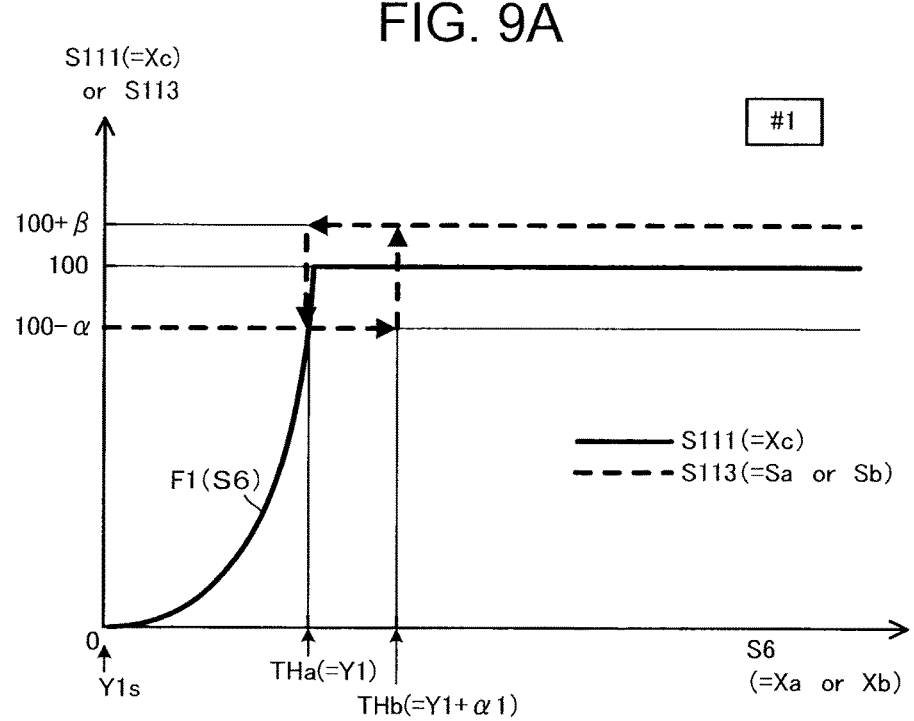
FIG. 9A and FIG. 9B are charts illustrating signals of the control part in the steam turbine system according to the second embodiment.
Figure 9B:
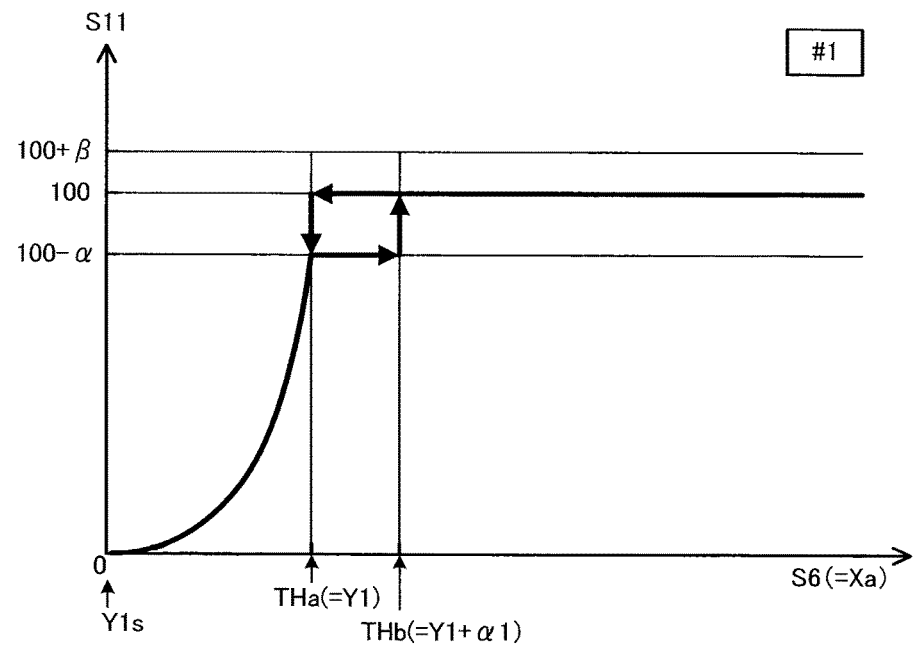

FIG. 9A and FIG. 9B illustrate some of the signals used in the first valve control part 11. Here, in FIG. 9A, the horizontal axis represents a signal value of an output signal S6 (=Xa or Xb) of a lower-value preference circuit 6. The vertical axis represents the signal value of the opening degree instruction signal S111 output by the function generator 111 constituting the first valve control part 11 (solid line) and a signal value of the output signal S113 of the switch circuit 113 constituting the first valve control part 11 (broken line). Further, in FIG. 9B, the horizontal axis represents the signal value of the output signal S6 (=Xa or Xb) of the lower-value preference circuit 6 and the vertical axis represents the signal value of the opening degree instruction signal S11 output by the lower-value preference circuit 115 constituting the first valve control part 11.

Similarly, FIG. 10A, FIG. 10B, FIG. 11A, FIG. 11B, FIG. 12A, and FIG. 12B illustrate some of the signals used in the second valve control part 12, the third valve control part 13, and the fourth valve control part 14. Here, in FIG. 10A, FIG. 11A, and FIG. 12A, the horizontal axis represents the signal value of the output signal S6 (=Xa or Xb) of the lower-value preference circuit 6. The vertical axis represents signal values of output signals S121, S131, S141 output by the function generators 121, 131, 141 constituting the second valve control part 12, the third valve control part 13, and the fourth valve control part 14 respectively (solid lines) and signal values of output signals S123, S133, S143 of the switch circuits 123, 133, 143 (broken lines). Further, in FIG. 10B, FIG. 11B, and FIG. 12B, the horizontal axis represents the signal value of the output signal S6 (=Xa or Xb) of the lower-value preference circuit 6 and the vertical axis represents the signal values of the opening degree instruction signals S12, S13, S14 output by the lower-value preference circuits 125, 135, 145 constituting the second valve control part 12, the third valve control part 13, and the fourth valve control part 14 respectively.

In FIG. 9A to FIG. 12B, functions F1(S6) to F4(S6) used in the function generators 111, 121, 131, 141 of the first to fourth valve control parts 11 to 14 are illustrated. Further, the threshold values THb (=Y1+α1, Y2+α2, Y3+α3, Y4+α4) used in the comparison processing by the comparators 116, 126, 136, 146 of the first to fourth valve control parts 11 to 14 are illustrated. In addition to these, the threshold values THa (=Y1, Y2, Y3, Y4) used when the cancelling circuits 117, 127, 137, 147 of the first to fourth valve control parts 11 to 14 operate.

[A-3-1] Regarding the Functions F1(S6) to F4(S6) Used by the Function Generators 111, 121, 131, 114

As illustrated in FIG. 9A, FIG. 10A, FIG. 11A, and FIG. 12A, the functions F1 (S6) to F4 (S6) are set so as to include a part where the signal values of the opening degree instruction signals S111 (=Xc), S121 (=Xd), S131 (=Xe), S141 (=Xf) increase in accordance with an increase of the signal value of the output signal S6 of the lower-value preference circuit 6.

Here, in the output signal S6 of the lower-value preference circuit 6, signal values Y1s, Y2s, Y3s, Y4s at which the signal values of the opening degree instruction signals S111, S121, S131, S141 exceed 0% become larger in the order of the first to fourth valve control parts 11 to 14. Further, in the output signals S6 of the lower-value preference circuit 6, signal values (not illustrated) at which the signal values of the opening degree instruction signals S111, S121, S131, S141 exceeds 100% become larger in the order of the first to fourth valve control part 11 to 14.

Concretely, as illustrated in FIG. 9A, the function F1 (S6) used in the function generator 111 of the first valve control part 11 is set so that the signal value of the opening degree instruction signal S111 (=Xc) increases in accordance with an increase of the signal value of the output signal S6 from 0 (=Y1s). Then, when the signal value of the output signal S6 of the lower-value preference circuit 6 becomes a value larger than the threshold value THa (=Y1), the signal value of the opening degree instruction signal S111 (=Xc) becomes 100%. Then, when the signal value of the output signal S6 becomes still larger, the signal value of the opening degree instruction signal S111 (=Xc) becomes constant at 100% irrespective of the increase of the signal value of the output signal S6.

Figure 10A:
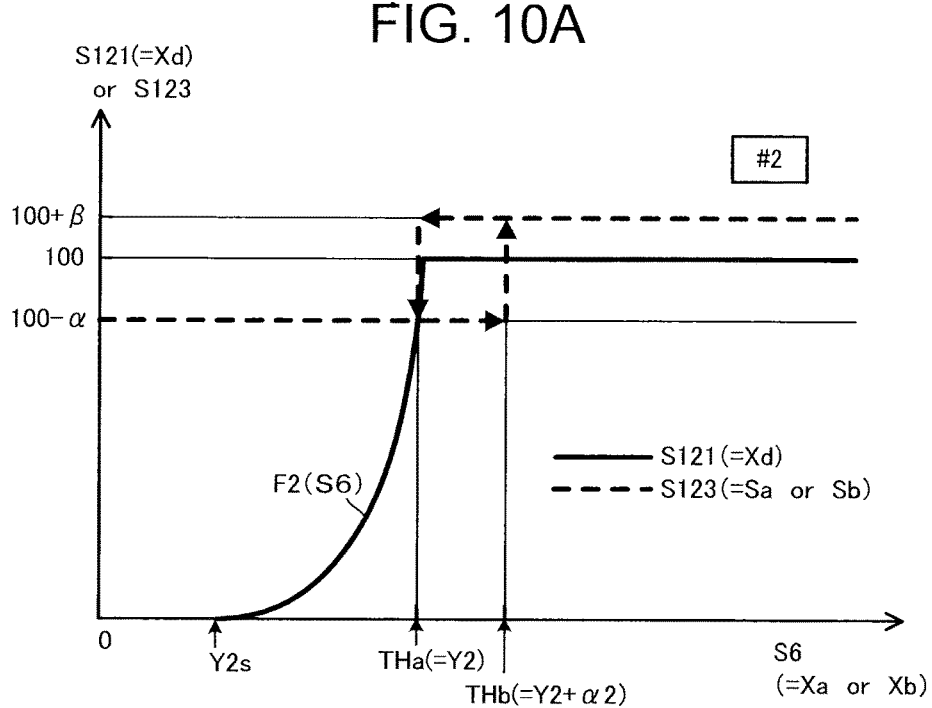
FIG. 10A and FIG. 10B are charts illustrating signals of the control part in the steam turbine system according to the second embodiment.
Figure 10B:
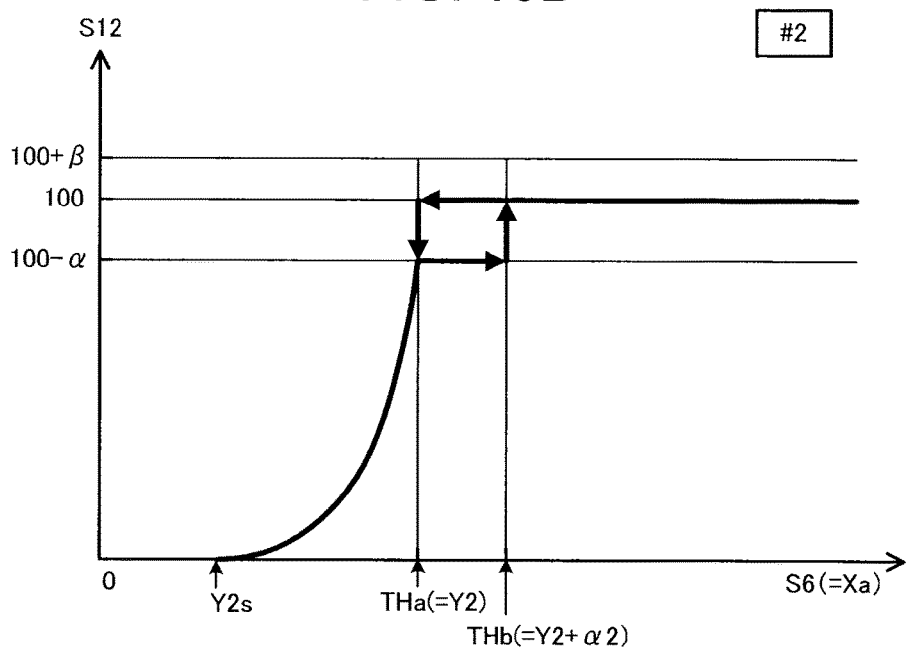

As illustrated in FIG. 10A, the function F2 (S6) used by the function generator 121 of the second valve control part 12 is set so that the signal value of the opening degree instruction signal S121 (=Xd) becomes 0 when the signal value of the output signal S6 of the lower-value preference circuit 6 is less than the predetermined signal value Y2s (>0). Then, as the signal value of the output signal S6 of the lower-value preference circuit 6 increases to be equal to or more than the predetermined value Y2s, the signal value of the opening degree instruction signal S121 (=Xd) becomes larger. Then, when the signal value of the output signal S6 of the lower-value preference circuit 6 becomes a value larger than the threshold value THa (=Y2>Y2s), the signal value of the opening degree instruction signal S121 (=Xd) becomes 100%. Then, when the signal value of the output signal S6 becomes still larger, the signal value of the opening degree instruction signal S121 (=Xd) becomes constant at 100% irrespective of the increase of the signal value of the output signal S6.

Figure 11A:
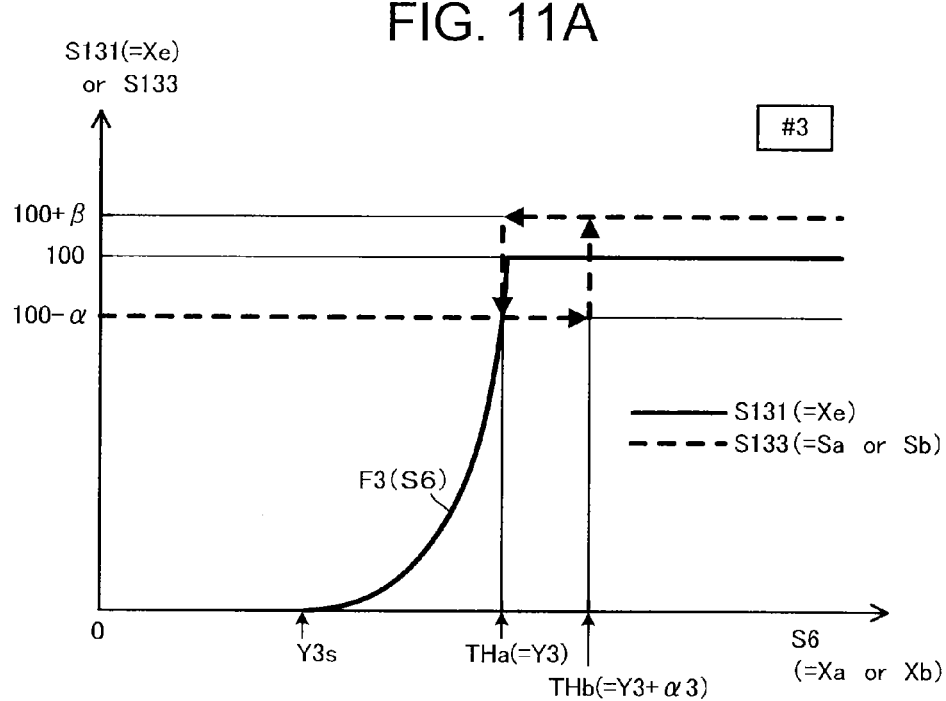
FIG. 11A and FIG. 11B are charts illustrating signals of the control part in the steam turbine system according to the second embodiment.
Figure 11B:
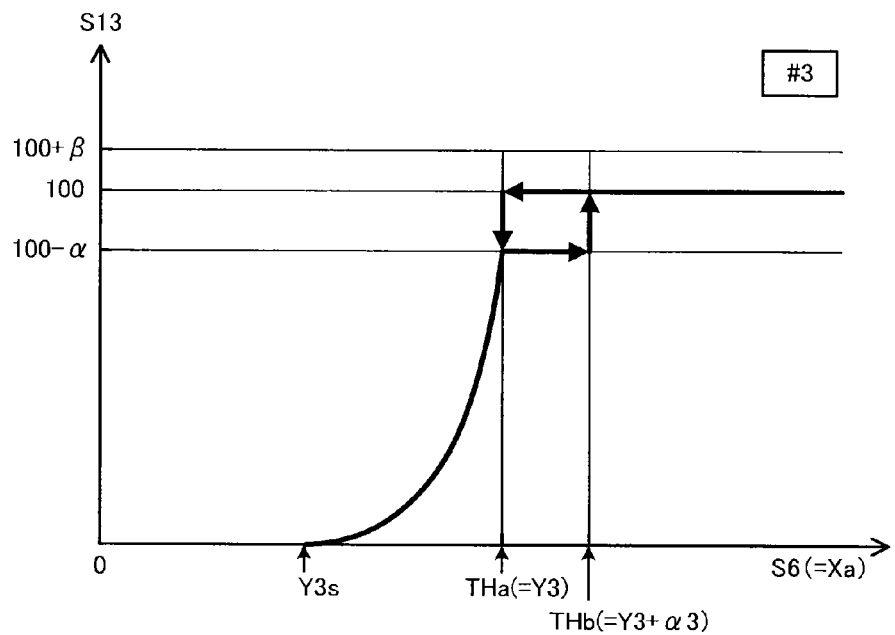

As illustrated in FIG. 11A, the function F3 (S6) used by the function generator 131 of the third valve control part 13 is set so that the signal value of the opening degree instruction signal S131 (=Xe) becomes 0 when the signal value of the output signal S6 of the lower-value preference circuit 6 is less than the predetermined signal value Y3s (>Y2s). Then, as the signal value of the output signal S6 of the lower-value preference circuit 6 increases to be equal to or more than the predetermined value Y3s, the signal value of the opening degree instruction signal S131 (=Xe) becomes larger. Then, when the signal value of the output signal S6 of the lower-value preference circuit 6 becomes a value larger than the threshold value THa (=Y3>Y3s), the signal value of the opening degree instruction signal S131 (=Xe) becomes 100%. Then, when the signal value of the output signal S6 becomes still larger, the signal value of the opening degree instruction signal S131 (=Xe) becomes constant at 100% irrespective of the increase of the signal value of the output signal S6.

Figure 12A:
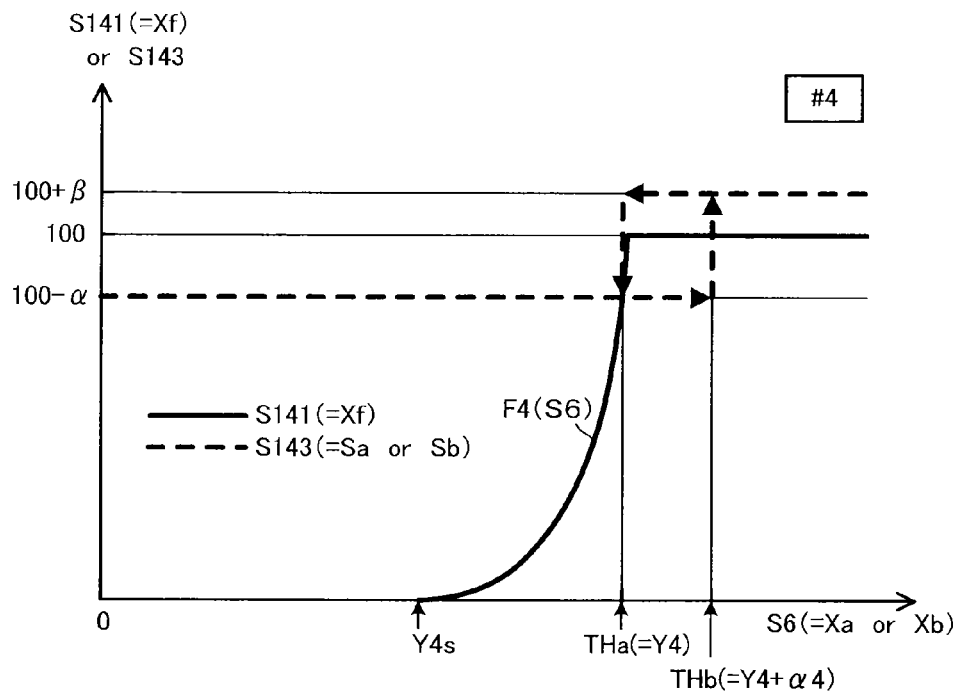
FIG. 12A and FIG. 12B are charts illustrating signals of the control part in the steam turbine system according to the second embodiment.
Figure 12B:
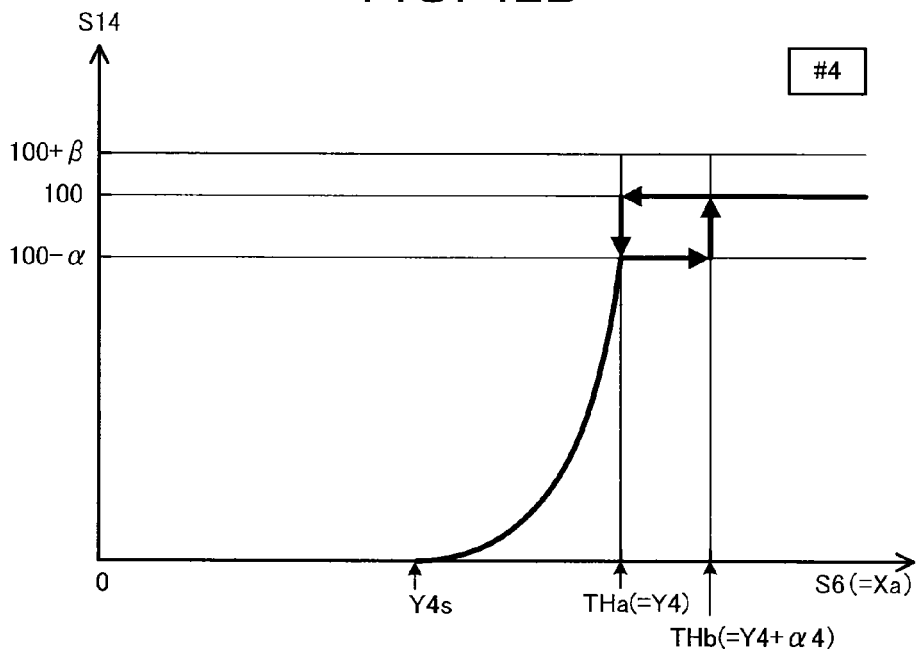

As illustrated in FIG. 12A, the function F4 (S6) used by the function generator 141 of the fourth valve control part 14 is set so that the signal value of the opening degree instruction signal S141 (=Xf) becomes 0 when the signal value of the output signal S6 of the lower-value preference circuit 6 is less than the predetermined signal value Y4s (>Y3s). Then, as the signal value of the output signal S6 of the lower-value preference circuit 6 increases to be equal to or more than the predetermined value Y4s, the signal value of the opening degree instruction signal S141 (=Xf) becomes larger. Then, when the signal value of the output signal S6 of the lower-value preference circuit 6 becomes a value larger than the threshold value THa (=Y4>Y4s), the signal value of the opening degree instruction signal S141 (=Xf) becomes 100%. Then, when the signal value of the output signal S6 becomes still larger, the signal value of the opening degree instruction signal S141 (=Xf) becomes constant at 100% irrespective of the increase of the signal value of the output signal S6.

[A-3-2] Regarding the Threshold Values THb (=Y1+$\alpha$, Y2+$\alpha$2, Y3+$\alpha$3, Y4+$\alpha$4) of the Comparators 116, 126, 136, 146

In the first to fourth valve control parts 11 to 14, the threshold values THb (=Y1+$\alpha$1, Y2+$\alpha$2, Y3+$\alpha$3, Y4+$\alpha$4) used in the comparison processing by the comparators 116, 126, 136, 146 are set so as to be larger in the order of the first to fourth valve control parts 11 to 14 as illustrated in FIG. 9A to FIG. 12B.

Concretely, the threshold value THb (=Y2+$\alpha$2) used in the comparison processing by the comparator 126 of the second valve control part 12 is larger than the threshold value THb (=Y1+$\alpha$1) used by the comparator 116 of the first valve control part 11. The threshold value THb (=Y3+$\alpha$3) used in the comparison processing by the comparator 136 of the third valve control part 13 is larger than the threshold value THb (=Y2+$\alpha$2) used by the comparator 126 of the second valve control part 12. The threshold value THb (=Y4+$\alpha$4) used in the comparison processing by the comparator 146 of the fourth valve control part 14 is larger than the threshold value THb (=Y3+$\alpha$3) used by the comparator 136 of the third valve control part 13 (that is, Y1+$\alpha$1<Y2+$\alpha$2<Y3+$\alpha$3<Y4+$\alpha$4).

[A-3-3] Regarding the threshold values THa (=Y1, Y2, Y3, Y4) of the cancelling circuits 117, 127, 137, 147

In the first to fourth valve control parts 11 to 14, the threshold values THa (=Y1, Y2, Y3, Y4) used when the cancelling circuits 117, 127, 137, 147 operate are set so as to become larger in the order of the first to fourth valve control parts 11 to 14 as illustrated in FIG. 9A to FIG. 12B.

Concretely, the threshold value THa (=Y2) used when the cancelling circuit 127 of the second valve control part 12 operates is larger than the threshold value THa (=Y1) used by the cancelling circuit 117 of the first valve control part 11. The threshold value THa (=Y3) used when the cancelling circuit 137 of the third valve control part 13 operates is larger than the threshold value THa (=Y2) used by the cancelling circuit 127 of the second valve control part 12. The threshold value THa (=Y4) used when the cancelling circuit 147 of the fourth valve control part 14 operates is larger than the threshold value THa (=Y3) used by the cancelling circuit 137 of the third valve control part 13 (that is, Y1<Y2<Y3<Y4).

The threshold values THa (Y1, Y2, Y3, Y4) used when the cancelling circuits 117, 127, 137, 147 operate correspond to values when the opening degrees of the first to fourth steam valves V10_1 to 4 are set to opening degrees (90% to 95%) smaller than the full opening degree (100%) by about 5% to about 10%, for instance.

Further, in the first to fourth valve control parts 11, 12, 13 14, the threshold values THa which are used when the cancelling circuits 117, 127, 137, 147 operate are smaller than the threshold values THb used in the comparison processing by the comparators 116, 126, 136, 146 (THa<THb). Therefore, the threshold values THb used in the comparison processing by the comparators 116, 126, 136, 146 correspond to the sums of the threshold values THa (=Y1, Y2, Y3, Y4) used when the cancelling circuits 117, 127, 137, 147 operate and predetermined values (=α1, α2, α3, α4) being, for example, about 5% to about 15%.

[C] Operation

The operation of the above-described steam turbine system will be described.

Here, with reference to FIG. 7 and FIG. 8 together with the aforesaid FIG. 9A, FIG. 9B, FIG. 10A, FIG. 10B, FIG. 11A, FIG. 11B, FIG. 12A, and FIG. 12B, regarding the operation of the control part 100 when the steam turbine is operated by the "nozzle governing method", the case of the "governor free operation" and the case of the "load limiter operation" will be described separately.

[C-1] Case of the "Governor Free Operation"

In the case of the "governor free operation", the load request signal S4 (=Xa) is equal to or less than a load limit signal S5 (=Xb) (S4≤S5 (that is, Xa≤Xb) as described above. Therefore, in the lower-value preference circuit 6, the load request signal S4 (=Xa) is selected and is output as the output signal S6 from the lower-value preference circuit 6 to the first valve control part 11, the second valve control part 12, the third valve control part 13, and the fourth valve control part 14 (refer to FIG. 7 and FIG. 8). Then, in each of the first valve control part 11, the second valve control part 12, the third valve control part 13, and the fourth valve control part 14, the arithmetic processing is performed and the opening degree instruction signals S11, S12, S13, S14 are output from the respective parts.

[C-1-1] The Operation of the First Valve Control Part 11

In the first valve control part 11, as in the case of the first embodiment, the output signal S6 Xa) of the lower-value preference circuit 6 is input to the function generator 111 as illustrated in FIG. 7. In the function generator 111, the opening degree instruction signal S111 (=Xc=F1 (Xa)) corresponding to the output signal S6 (=Xa) of the lower-value preference circuit 6 is found by using the function F1(S6) (refer to FIG. 9A) and is output to the lower-value preference circuit 115.

Further, as illustrated in FIG. 7, the load request signal S4 Xa) and the load limit signal S5 (=Xb) are input to the comparator 112 (first comparator). Then, in the comparator 112, the comparison processing is performed, and based on the result of the comparison processing, the output signal S112 is output from the comparator 112. Here, since the "governor free operation" is performed, the value of the load request signal S4 (=Xa) is equal to or less than a value of the load limit signal S5 (=Xb) (S4≤S5 (that is, Xa≤Xb)). Therefore, in this case, the output signal S112 whose signal value is 0 (Low signal) is output from the comparator 112 to the OR circuit 118.

Along with this, in the first valve control part 11, the load request signal S4 (=Xa) output by the adder 4 is input to the comparator 116 (second comparator) as illustrated in FIG. 7, as is not the case in the first embodiment. Then, in the comparator 116, the comparison processing of comparing the input load request signal S4 and the preset threshold value THb (=Y1+α1) is performed (refer to FIG. 9). Then, according to the result of the comparison processing, the comparator 116 outputs the output signal S116 to the OR circuit 118.

Here, when the value of the load request signal S5 (=Xa) is equal to or less than the threshold value THb (=Y1+α1) (S4≤THb), the comparator 116 outputs the output signal S116 whose signal value is 0 (Low signal) to the OR circuit 118. On the other hand, when the value of the load request signal S4 (=Xa) is larger than the threshold value THb (=Y1+α1) (S4>THb), the comparator 116 outputs the output signal S116 whose signal value is 1 (High signal) to the OR circuit 118.

In the OR circuit 118, as illustrated in FIG. 7, the logical sum operation processing of the output signal S112 of the comparator 112 (first comparator) and the output signal S116 of the comparator 116 (second comparator) is performed, and the operation result is output as the output signal S118.

Concretely, when at least one of the signal values of the output signal S112 of the comparator 112 (first comparator) and the output signal S116 of the comparator 116 (second comparator) is 1, the OR circuit 118 outputs the output signal S118 whose signal value is 1 (High signal). On the other hand, when the signal values of the output signal S112 of the comparator 112 (first comparator) and the output signal S116 of the comparator 116 (second comparator) are both 0, the OR circuit 118 outputs the output signal S118 whose signal value is 0 (Low signal).

Here, since the "governor free operation" is performed, the output signal S112 whose signal value is 0 (Low signal) is input to the OR circuit 118 from the comparator 112 (first comparator) as described above. Therefore, when the signal value of the output signal S116 output by the comparator 116 (second comparator) is 1 (High signal), the OR circuit 118 outputs the output signal S118 whose signal value is 1 (High signal). On the other hand, when the signal value of the output signal S116 output by the comparator 116 (second comparator) is 0 (Low signal), the OR circuit 118 outputs the output signal S118 whose signal value is 0 (Low signal).

When the signal value of the output signal S118 output by the OR circuit is 0 (Low signal), a 100–α% opening degree instruction signal Sa is output as the output signal S113 from the switch circuit 113 to the change rate limiter 114. Then, the output signal S114 (=Sa=100–α%) is output from the change rate limiter 114 to the lower-value preference circuit 115. On the other hand, when the signal value of the output signal S118 output by the OR circuit 118 is 1 (High signal), a 100+β% opening degree instruction signal Sb is output as the output signal S113 from the switch circuit 113 to the change rate limiter 114. Then, the output signal S114 (=Sb=100+β%) is output from the change rate limiter 114 to the lower-value preference circuit 115.

Then, as illustrated in FIG. 7, in the lower-value preference circuit 115, the comparison processing of comparing the opening degree instruction signal S111 (=Xc=F(Xa)) output by the function generator 111 and the output signal S114 (=Sa or Sb) output by the change rate limiter 114 is performed. Then, the lower value of the both is output as the opening degree instruction signal S11 to the first steam valve V10_1.

The output signal S114 (=Sa or Sb) of the change rate limiter 114 is the same as the output signal S113 of the switch circuit 113 unless the output signal S113 of the switch circuit 113 changes (refer to FIG. 5). Therefore, as illustrated in FIG. 9A, the output signal S113 (broken line) of the switch circuit 113 and the opening degree instruction signal S111 (bold solid line) output by the function generator 111 are compared and the lower value thereof is output as the opening degree instruction signal S11 from the lower-value preference circuit 115 as illustrated in FIG. 9B.

Concretely, as illustrated in FIG. 9A and FIG. 9B, when the output signal S6 (=load request signal Xa) of the lower-value preference circuit 6 increases within a range from the signal value Y1s for fully closing (0%) the first steam valve V10_1 to a value equal to or less than the threshold value THb (=Y1+α1) which is larger than the signal value for fully opening (100%) the first steam valve V10_1 (0≤Xa≤THb), the opening degree instruction signal S11 is output so that the limited opening degree (100−α%) limited to be smaller than the maximum opening degree (100%) is set as the upper limit.

Here, as illustrated in FIG. 9A, when the signal value of the output signal S6 (=Xa) output by the lower-value preference circuit 6 is smaller than the threshold value THa (=Y1), the opening degree instruction signal S111 output by the function generator 111 is lower in value than the output signal S113 (=Sa=100−α%) of the switch circuit 113. Therefore, as illustrated in FIG. 9B, the same signal as the opening degree instruction signal S111 output by the function generator 111 is output as the opening degree instruction signal S11 from the lower-value preference circuit 115. In this case, the opening degree instruction signal S11 is output so that the signal value of the opening degree instruction signal S11 output by the lower-value preference circuit 115 increases in accordance with the increase of the signal value of the output signal S6 of the lower-value preference circuit 6. As a result, according to the signal value of the opening degree instruction signal S11 output by the lower-value preference circuit 115, the opening degree of the first steam valve V10_1 is adjusted between the fully closed state (full close=0%) and the limited opening degree (100−α%) limited to be smaller than the maximum opening degree.

As illustrated in FIG. 9A, when the signal value of the output signal S6 output by the lower-value preference circuit 6 increases from the state of being smaller than the threshold value THa (=Y1) to become less than the threshold value THb (=Y1+α1) which is larger than the threshold value THa (=Y1), the output signal S113 (=Sa=100−α) of the switch circuit 113 is lower in value than the opening degree instruction signal S111 output by the function generator 111. Therefore, as illustrated in FIG. 9B, the same signal as the output signal S113 (=Sa=100−α) of the switch circuit 113 is output as the opening degree instruction signal S11 from the lower-value preference circuit 115. In this case, the opening degree instruction signal S11 is output so that the signal value of the opening degree instruction signal S11 output by the lower-value preference circuit 115 becomes a constant value of 100−α% irrespective of the increase of the signal value of the output signal S6 output by the lower-value preference circuit 6. As a result, the opening degree of the first steam valve V10_1 is adjusted so as to be the limited opening degree (100−α%) limited to be smaller than the maximum opening degree, instead of the maximum opening degree (full open=100%).

On the other hand, as illustrated in FIG. 9A, when the output signal S6 (=Xa) of the lower-value preference circuit 6 exceeds the threshold value THb (=Y1+α1) (Xa>THb), the opening degree instruction signal S111 output by the function generator 111 is lower in value than the output signal S113 (=Sb=100+β) of the switch circuit 113. Therefore, as illustrated in FIG. 9B, the same signal as the opening degree instruction signal S111 output by the function generator 111 is output as the opening degree instruction signal S11 from the lower-value preference circuit 115. In this case, the opening degree instruction signal S11 is output so that the signal value of the opening degree instruction signal S11 output by the lower-value preference circuit 115 becomes a constant value of 100% irrespective of the increase of the signal value of the output signal S6 output by the lower-value preference circuit 6. As a result, the opening degree of the first steam valve V10_1 is adjusted so as to be the maximum opening degree (full open=100%).

Besides, in this embodiment, when the comparator 116 (second comparator) outputs the output signal S116 whose signal value is 1 (High signal), the cancelling circuit 117 holds the output signal S116 whose signal value is 1, and when the value of the load request signal S4 (=Xa) decreases to be equal to or less than the threshold value THa (THa=Y1), the cancelling circuit 117 cancels the output signal S116 whose signal value is 1 (High signal), as described above. Then, in this case, the cancelling circuit 117 sets the signal value of the output signal S116 output by the comparator 116 (second comparator) to 0 (Low signal).

By this operation, as illustrated in FIG. 9A, even when the output signal S6 of the lower-value preference circuit 6 decreases from the state over the threshold value THb to a value equal to or less than the threshold value THb, the opening degree instruction signal S111 output by the function generator 111 becomes lower in value than the output signal S113 (=Sb=100+β) of the switch circuit 113. Therefore, as illustrated in FIG. 9B, the same signal as the opening degree instruction signal S111 output by the function generator 111 is output as the opening degree instruction signal S11 from the lower-value preference circuit 115. In this case, the opening degree instruction signal S11 is output so that the signal value of the opening degree instruction signal S11 output by the lower-value preference circuit 115 becomes a constant value of 100% irrespective of the decrease of the signal value of the output signal S6 output by the lower-value preference circuit 6. As a result, the opening degree of the first steam valve V10_1 is adjusted so as to be the maximum opening degree (full open).

Then, as illustrated in FIG. 9A, when the output signal S6 of the lower-value preference circuit 6 further decreases from the threshold value THb to be equal to or lower than the threshold value THa, the opening degree instruction signal S111 output by the function generator 111 becomes lower in value than the output signal S113 (=Sa=100−α) of the switch circuit 113. Therefore, as illustrated in FIG. 9B, the same signal as the opening degree instruction signal S111 output by the function generator 111 is output as the opening degree instruction signal S11 from the lower-value preference circuit 115. In this case, the opening degree instruction signal S11 is output so that the signal value of the opening degree instruction signal S11 output by the lower-value preference circuit 115 decreases in accordance with the decrease of the signal value of the output signal S6 of the lower-value preference circuit 6. As a result, the opening degree of the first steam valve V10_1 is adjusted between a state where it is opened to the maximum opening degree (full open) and a state where it is fully closed (full close) according to the signal value of the opening degree instruction signal S11 output by the lower-value preference circuit 115.

[C-1-2] The Operation of the Second Valve Control Part 12, the Third Valve Control Part 13, and the Fourth Valve Control Part 14

In the second valve control part 12, the third valve control part 13, and the fourth valve control part 14, the arithmetic processing is performed as in the case of the first valve control part 11, Then, the opening degree instruction signals S12, S13, S14 are output to the second steam valve V10_2, the third steam valve V10_3, and the fourth steam valve V10_4 respectively (refer to FIG. 7, FIG. 8, FIG. 10A, FIG. 10B, FIG. 11A, FIG. 11B, FIG. 12A, and FIG. 12B).

[C-1-3] The Operation of the First to Fourth Steam Valves 10_1 to 4

The opening degrees of the first to fourth steam valves V10_1 to 4 are adjusted to those corresponding to the signal values of the opening degree instruction signals S11 to S14 output from the first to fourth valve control parts 11 to 14 respectively as illustrated in FIG. 7 and FIG. 8. Here, the opening degrees of the first to fourth steam valves V10_1 to 4 are adjusted according to the opening degree instruction signals S11, S12, S13, S14 respectively illustrated in FIG. 9B, FIG. 10B, FIG. 11B, and FIG. 12B.

[C-1-3-1] the Operation when the Signal Values of the Opening Degree Instruction Signals S11 to S14 Increase (Opening Operation)

As illustrated in FIG. 9B, FIG. 10B, FIG. 11B, and FIG. 12B, the signal values of the opening degree instruction signals S11, S12, S13, S14 become larger than 0% in the order of the first valve control part 11, the second valve control part 12, the third valve control part 13, and the fourth valve control part 14 in accordance with an increase of the output signal S6 (=Xa (load request signal)) of the lower-value preference circuit 6. Therefore, the first to fourth steam valves V10_1 to 4 are opened in the order of the first steam valve V10_1, the second steam valve V10_2, the third steam valve V10_3, and the fourth steam valve V10_4.

Further, the signal values of the opening degree instruction signals S11, S12, S13, S14 become the 100% value in the order of the first valve control part 11, the second valve control part 12, the third valve control part 13, and the fourth valve control part 14 in accordance with the increase of the output signal S6 of the lower-value preference circuit 6. Therefore, the first to fourth steam valves V10_1 to 4 are fully opened in the order of the first steam valve V10_1, the second steam valve 10_2, the third steam valve 10_3, and the fourth steam valve 10_4.

When the output signal S6 of the lower-value preference circuit 6 is equal to or less than the threshold value THb, the signal values of the opening degree instruction signals S11, S12, S13, S14 are 100−α% or less. Therefore, in this case, the first to fourth steam valves V10_1 to 4 are controlled, with the limited opening degree (100−α%) limited to be smaller than the maximum opening degree (full open) being set as the upper limit.

Thereafter, when the output signal S6 of the lower-value preference circuit 6 exceeds the threshold value THb, the signal values of the opening degree instruction signals S11, S12, S13, S14 become 100%. Therefore, in this case, the opening degrees of the first to fourth steam valves V10_1 to 4 become the maximum opening degree (full open).

Figure 13:
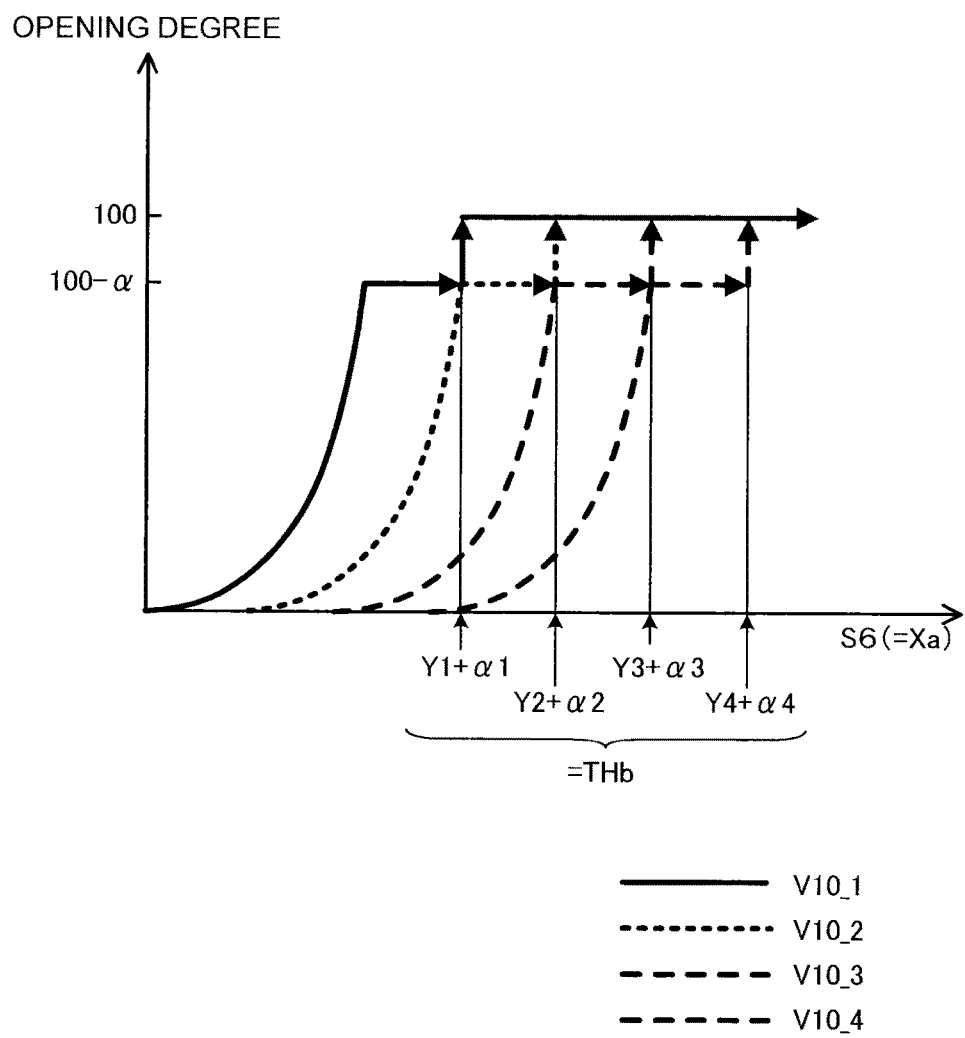
FIG. 13 is a chart illustrating a relation between opening degrees of first to fourth steam valves and an output signal (load request signal) of a lower-value preference circuit in the steam turbine system according to the second embodiment.

FIG. 13 is a chart illustrating a relation between the opening degrees of the first to fourth steam valves V10_1 to 4 and the output signal S6 (=Xa (load request signal)) of the lower-value preference circuit 6 in the steam turbine system according to the second embodiment. In FIG. 13, the operation when the first to fourth steam valves V10_1 to 4 are opened (opening operation) is illustrated.

In FIG. 13, the horizontal axis represents the signal value of the output signal S6 (=Xa) of the lower-value preference circuit 6 and the vertical axis represents the opening degrees of the first to fourth steam valves V10_1 to 4. FIG. 13 corresponds to a chart in which the cases where the signal values of the opening degree instruction signals S11 to S14 illustrated in FIG. 9B, FIG. 10B, FIG. 11B, and FIG. 12B increase are superimposed.

As illustrated in FIG. 13, in accordance with the increase of the output signal S6 (load request signal Xa) of the lower-value preference circuit 6, the first steam valve V10_1, the second steam valve V10_2, the third steam valve V10_3, and the fourth steam valve V10_4 come to have the maximum opening degree (are fully opened) after opened in the order mentioned.

As illustrated in FIG. 13, the first steam valve V10_1 is controlled, with the limited opening degree (100−α%) limited to be smaller than the maximum opening degree being set as the upper limit until the output signal S6 (load request signal) of the lower-value preference circuit 6 reaches the threshold value THb (=Y1+α1). Then, when the threshold value THb (=Y1+α1) is exceeded, the first steam valve V10_1 comes to have the maximum opening degree (is fully opened).

As illustrated in FIG. 13, the second steam valve V10_2 is opened next to the first steam valve V10_1 and is controlled, with the limited opening degree (100−α%) limited to be smaller than the maximum opening degree being set as the upper limit until the output signal S6 (load request signal) of the lower-value preference circuit 6 reaches the threshold value THb (=Y2+α2). Then, when the threshold value THb (=Y2+α2) is exceeded, the second steam valve V10_2 comes to have the maximum opening degree (is fully opened) next to the first steam valve V10_1.

As illustrated in FIG. 13, the third steam valve V10_3 is opened next to the second steam valve V10_2 and is controlled, with the limited opening degree (100−α%) limited to be smaller than the maximum opening degree being set as the upper limit until the output signal S6 (load request signal) of the lower-value preference circuit 6 reaches the threshold value THb (=Y3+α3). Then, when the threshold value THb (=Y3+α3) is exceeded, the third steam valve V10_3 comes to have the maximum opening degree (is fully opened) next to the second steam valve V10_2.

As illustrated in FIG. 13, the fourth steam valve V10_4 is opened next to the third steam valve V10_3 and is controlled, with the limited opening degree (100−α%) limited to be smaller than the maximum opening degree being set as the upper limit until the output signal S6 (load request signal) of the lower-value preference circuit 6 reaches the threshold value THb (=Y4+α4). Then, when the threshold value THb (=Y4+α4) is exceeded, the fourth steam valve V10_4 comes to have the maximum opening degree (is fully opened) next to the third steam valve V10_3.

[C-1-3-2] the Operation when the Signal Values of the Opening Degree Instruction Signals S11 to S14 Decrease after Reaching 100% (Closing Operation)

As illustrated in FIG. 9B, FIG. 10B, FIG. 11B, and FIG. 12B, after the signal values of the opening degree instruction signals S11, S12, S13, S14 once become 100%, the signal values of the opening degree instruction signals S11, S12, S13, S14 are kept at 100% until the output signal S6 of the lower-value preference circuit 6 decreases to the threshold value THa which is lower than the aforesaid threshold value THb. Therefore, in this case, the first to fourth steam valves V10_1 to 4 are kept at the maximum opening degree (fully opened).

Then, when the output signal S6 of the lower-value preference circuit 6 becomes smaller than the threshold value THa, the signal values of the opening degree instruction signals S11, S12, S13, S14 decrease from the state of the 100% value to the values obtained by using the functions F1(S6), F2(S6), F3(S6), F4(S6). Then, the opening degrees of the first to fourth steam valves V10_1 to 4 are adjusted to the opening degrees according to the output signal S6 of the lower-value preference circuit 6.

That is, unlike the case where the output signal S6 of the lower-value preference circuit 6 increases, when the output signal S6 of the lower-value preference circuit 6 decreases, the opening degrees of the first to fourth steam valves V10_1 to 4 are not limited to the limited opening degree smaller than the maximum opening degree but they are opened to the maximum opening degree as in the normal "governor free operation".

Figure 14:
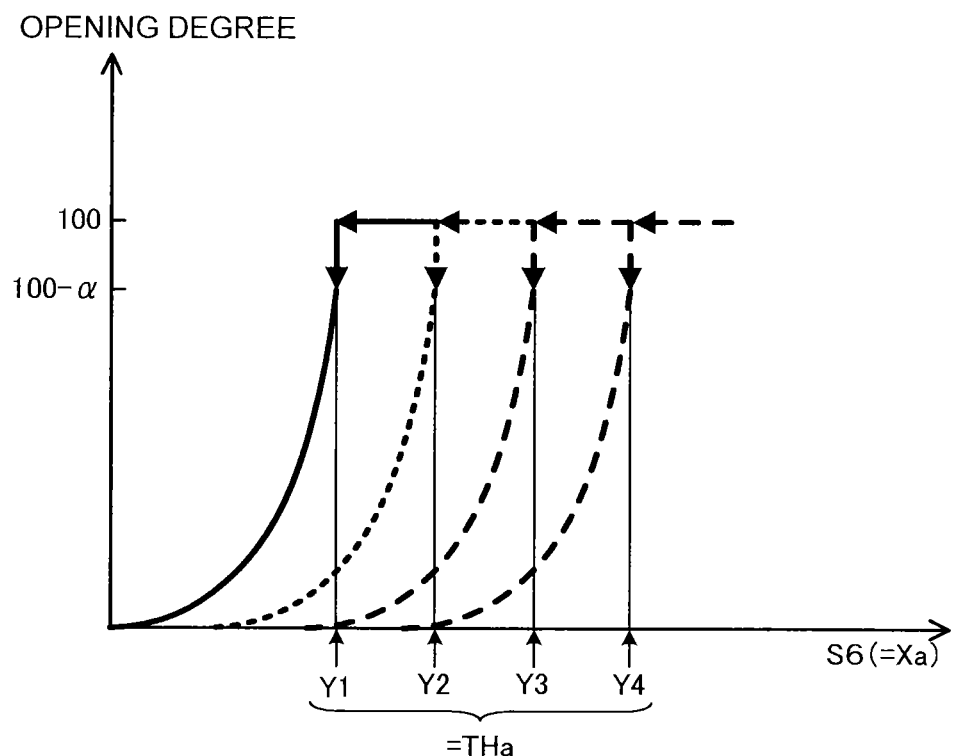
FIG. 14 is a chart illustrating a relation between the opening degrees of the first to fourth steam valves and the output signal (load request signal) of the lower-value preference circuit 6 in the steam turbine system according to the second embodiment.
Figure 15:
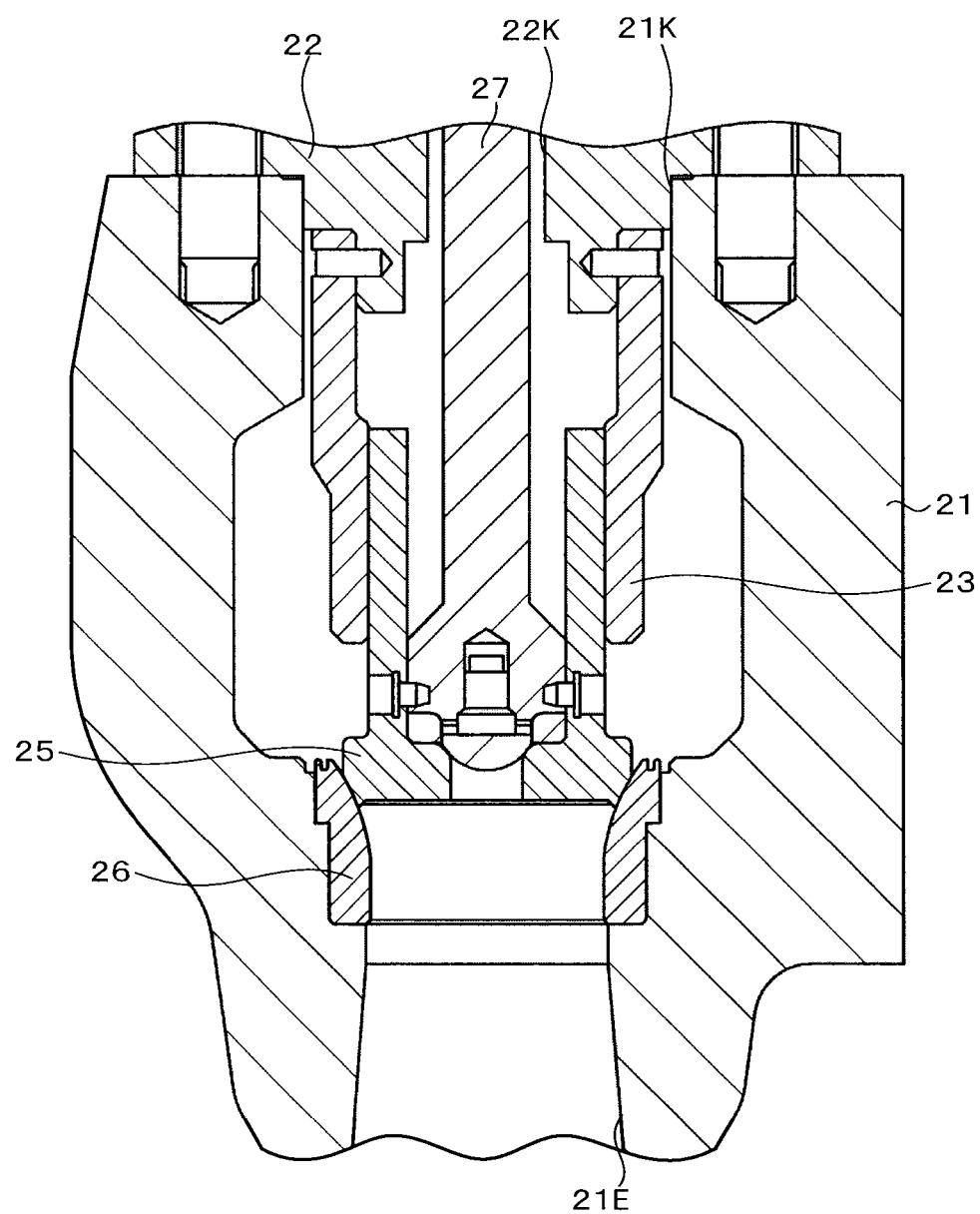
FIG. 15 is a cross-sectional view schematically illustrating an example of a steam valve according to a related art.

FIG. 14 is a chart illustrating a relation between the opening degrees of the first to fourth steam valves V10_1 to 4 and the output signal S6 (=Xa (load request signal)) of the lower-value preference circuit 6 in the steam turbine system according to the second embodiment. In FIG. 14, the operation when the first to fourth steam valves V10_1 to 4 are closed (closing operation) is illustrated.

As in FIG. 13, in FIG. 14, the horizontal axis represents the signal value of the output signal S6 (=Xa) of the lower-value preference circuit 6 and the vertical axis represents the opening degrees of the first to fourth steam valves V10_1 to 4. FIG. 14 corresponds to a chart in which the cases where the signal values of the opening degree instruction signals S11 to S14 illustrated in FIG. 9B, FIG. 10B, FIG. 11B, and FIG. 12B decrease are superimposed.

As illustrated in FIG. 14, after the fourth steam valve V10_4, the third steam valve V10_3, the second steam valve V10_2, and the first steam valve V10_1 are closed from the full open state in the order mentioned in accordance with a decrease of the output signal S6 (load request signal Xa) of the lower-value preference circuit 6, they are fully closed.

As illustrated in FIG. 14, the fourth steam valve V10_4 is controlled to have the maximum opening degree (100%) until the output signal S6 (load request signal) of the lower-value preference circuit 6 reaches the threshold value THa (=Y4). Then, when the output signal S6 becomes lower than the threshold value THa (=Y4), the fourth steam valve V10_4 starts to be closed to be fully closed.

As illustrated in FIG. 14, the third steam valve V10_3 is controlled to have the maximum opening degree (100%) until the output signal S6 (load request signal) of the lower-value preference circuit 6 reaches the threshold value THa (=Y3). Then, the third steam valve V10_3 is closed next to the fourth steam valve V10_4. Here, it is not until the output signal S6 becomes lower than the threshold value THa (=Y3) that the third steam valve V10_3 starts to be closed to be fully closed.

As illustrated in FIG. 14, the second steam valve V10_2 is controlled to have the maximum opening degree (100%) until the output signal S6 (load request signal) of the lower-value preference circuit 6 reaches the threshold value THa (=Y2). Then, the second steam valve V10_2 is closed next to the third steam valve V10_3. Here, it is not until the output signal S6 becomes lower than the threshold value THa (=Y2) that the second steam valve V10_2 starts to be closed to be fully closed.

As illustrated in FIG. 14, the first steam valve V10_1 is controlled to have the maximum opening degree (100%) until the output signal S6 (load request signal) of the lower-value preference circuit 6 reaches the threshold value THa (=Y1). Then, the first steam valve V10_1 is closed next to the second steam valve V10_2. Here, it is not until the output signal S6 becomes lower than the threshold value THa (=Y1) that the first steam valve V10_1 starts to be closed to be fully closed.

In this manner, in the output signal S6 of the lower-value preference circuit 6, the signal value at which the opening operation of opening the valve to the full open position is started is the threshold value THb. On the other hand, in the output signal S6 of the lower-value preference circuit 6, the signal value at which the "closing operation" of closing the valve from the full open position is started is the threshold value THa which is lower than the signal value (threshold value THb) at which the "opening operation" of opening the valve to the full open position is started. The starting point at which the "opening operation" to the full open position is started is different from the starting point at which the "closing operation" from the full open position is started.

[B-2] The Case of the "Load Limiter Operation"

In the case of the "load limiter operation", the load request signal S4 (=Xa) is larger than the load limit signal S5 (=Xb) (S4>S5 (that is, Xa>Xb)) as described above. Therefore, in the lower-value preference circuit 6, the load limit signal S5 (=Xb) is selected, and the selected load limit signal S5 (=Xb) is output as the output signal S6 from the lower-value preference circuit 6 to the first valve control part 11, the second valve control part 12, the third valve control part 13, and the fourth valve control part 14 (refer to FIG. 7 and FIG. 8). Then, the arithmetic processing is performed in the first valve control part 11, the second valve control part 12, the third valve control part 13, and the fourth valve control part 14, and the opening degree instruction signals S11, S12, S13, S14 are output from the respective parts.

In the first valve control part 11, as illustrated in FIG. 7, the output signal S6 (=Xb) output from the lower-value preference circuit 6 is input to the function generator 111. In the function generator 111, the opening degree instruction signal S111 (Xc=F1 (Xb)) corresponding to the output signal S6 (=Xb) output by the lower-value preference circuit 6 is found by using the function F1 (S6) and is output to the lower-value preference circuit 115.

Besides the above, in the first valve control part 11, the load request signal S4 (=Xa) and the load limit signal S5 (=Xb) are input to the comparator 112 (first comparator) as illustrated in FIG. 7. Then, the comparison processing is performed in the comparator 112, and based on the result of the comparison processing, the output signal S112 is output from the comparator 112. Here, since the "load limiter operation" is performed, the value of the load request signal S4 (=Xa) is larger than the value of the load limit signal S5 (=Xb) (S4>S5 (Xa>Xb)). Therefore, in this case, the output signal S112 whose signal value is 1 (High signal) is output from the comparator 112 to the OR circuit 112.

As illustrated in FIG. 7, in the OR circuit 118, the output signal S112 of the comparator 112 (first comparator) is input and in addition, the output signal S116 of the comparator 116 (second comparator) is input. The output signal S112 of the comparator 112 (first comparator) is the signal whose signal value is 1 (High signal) as described above. Therefore, the OR circuit 118 outputs the output signal S118 whose signal value is 1 (High signal) to the switch circuit 113.

Since the signal value of the output signal S118 of the OR circuit 118 is 1, the switch circuit 113 outputs the 100+β% opening degree instruction signal Sb as the output signal S113 to the change rate limiter 114. Thereafter, the change rate limiter 114 outputs the output signal S114 (=Sb=100+β%) to the lower-value preference circuit 115.

Then, in the lower-value preference circuit 115, the comparison processing of comparing the opening degree instruction signal S111 (=Xc=F(Xb)) output by the function generator 111 and the output signal S114 (=Sb=100+β%) output by the change rate limiter 114 is performed. Then, the lower value of the both is output as the opening degree instruction signal S11 to the first steam valve V10_1.

Therefore, the opening degree instruction signal S11 output by the lower-value preference circuit 115 becomes equal to or less than 100+β% as illustrated in FIG. 9A, and concretely, as illustrated in FIG. 9B, the upper limit of the signal value becomes 100%. Consequently, the first steam valve V10_1 is opened to the maximum opening degree (100%).

In the second valve control part 12, the third valve control part 13, and the fourth valve control part 14, as in the case of the first valve control part 11, the arithmetic processing is performed, and the opening degree instruction signals S12, S13, S14 are output to the second steam valve V10_2, the third steam valve V10_3, and the fourth steam valve V10_4 respectively (refer to FIG. 7 and FIG. 8). The upper limit of the signal values of the opening degree instruction signals S12, S13, S14 output by the second valve control part 12, the third valve control part 13, and the fourth valve control part 14 respectively become 100%, similarly to the above. Therefore, the second steam valve V10_2, the third steam valve V10_3, and the fourth steam valve V10_4 are opened to the maximum opening degree, similarly to the first steam valve V10_1.

[C] Summary

As described above, in the steam turbine system of this embodiment, the control part 100 operates the turbines by the "nozzle governing method". The control part 100 outputs the opening degree instruction signals S11, S12, S13 to the plural steam valves V10_1 to 4 respectively according to the output signal S6 (=load request signal Xa) of the lower-value preference circuit 6 and so on, thereby controlling the plural steam valves V10_1 to 4 so that the plural steam valves V10_1 to 4 start to open to have the maximum opening degree (be fully opened) in the order mentioned.

In this embodiment, when the "governor free operation" is performed, the control part 100 controls the steam valve whose opening degree is adjusted for the speed governing, out of the plural steam valves V10_1 to 4, by setting the limited opening degree (100−α%) limited to be smaller than the maximum opening degree (100%) as the upper limit.

Concretely, when the output signal S6 (=load request signal Xa) of the lower-value preference circuit 6 increases in the range (0≤Xa≤THb) from the signal value at which the plural steam valves V10_1 to 4 are fully closed to a value equal to or less than the threshold value THb (=Y1+α1, Y2+α2, Y3+α3, Y4+α4) which is larger than the signal value at which the plural steam valves V10_1 to 4 are fully opened, the control part 100 outputs the opening degree instruction signals S11, S12, S13, S14 to control the plural steam valves 10_1 to 4 so that the limited opening degree (100−α%) limited to be smaller than the maximum opening degree (100%) becomes the upper limit (refer to FIG. 9A to FIG. 12B).

When the output signal S6 (=load request signal Xa) of the lower-value preference circuit 6 falls within the range exceeding the threshold value THb (=Y1+α1, Y2+α2, Y3+α3, Y4+α4) (Xa>THb), the control part 100 does not set the limited opening degree (100−α%) as the upper limit but outputs the opening degree instruction signals S11, S12, S13, S14 to control the plural steam valves V10_1 to 4 so that the opening degrees become the maximum opening degree (100%) (refer to FIG. 9A to FIG. 12B).

When the output signal S6 (=load request signal Xa) of the lower-value preference circuit 6 decreases from the state exceeding the threshold value THb (=Y1+α1, Y2+α2, Y3+α3, Y4+α4) to fall within a range between a value equal to or lower than the threshold value THb and the threshold value THa (=Y1, Y2, Y3, Y4) which is smaller than the signal value at which the plural steam valves V10_1 to 4 are fully opened (THa<Xa≤THb), the control part 100 controls the plural steam valves V10_1 to 4 so that the maximum opening degree (100%) is kept (refer to FIG. 9A to FIG. 12B).

Then, when the output signal S6 (=load request signal Xa) of the lower-value preference circuit 6 decreases to the range (THa<Xa≤THb) equal to or lower than the threshold value THa (=Y1, Y2, Y3, Y4), the plural steam valves V10_1 to 4 are controlled to have the opening degrees according to the signal value of the output signal S6 (=load request signal Xa) of the lower-value preference circuit 6 as is normally done (refer to FIG. 9A to FIG. 12B).

Therefore, in the "governor free operation", even when the system frequency changes to periodically vary the opening degree instruction signals S11 to S14, it is possible to prevent the valve rod 27 from repeatedly coming into contact with the upper cover 22 (refer to FIG. 16). As a result, it is possible to prevent the occurrence of cracks in the plural steam valves V10_1 to 4 due to fatigue failure.

On the other hand, when the "load limiter operation" is performed, the control part 100 does not limit the opening degrees of the plural steam valves V10_1 to 4 but controls them by setting the maximum opening degree as the upper limit. Therefore, the state where the valve rod 27 is in contact with the upper cover 22 is kept at the full open position, which makes it possible to prevent the steam from leaking from the gap between the valve rod 27 and the upper cover 22 (refer to FIG. 16). As a result, performance of the turbine can be improved.

Therefore, in this embodiment, it is possible to stably operate the steam turbine.

OTHERS

Several embodiments of the present invention are described, but these embodiments are only exemplary presentations and are not intended to limit the scope of the invention. These novel embodiments can be implemented in various other forms, and various omissions, substitutions, and changes can be made therein without departing from the spirit of the invention. These embodiments and their modifications are included in the scope and spirit of the invention and are also included in the scope of the inventions described in the claims and their equivalencies.

What is claimed is:

1. A steam valve control device for controlling a steam valve to adjust a flow rate of steam flowing into an inlet of a steam turbine, the steam valve having an upper cover and a valve rod which is installed so as to penetrate through the through hole of the upper cover, the valve rod having a contact surface which is formed so as to come into mechanical contact with the upper cover to prevent the steam from leaking from a gap between the upper cover and the valve rod when the steam valve is opened to a maximum opening degree, the steam valve control device comprising:

a control part configured to control the operation of the steam valve by setting a limited opening degree limited to be smaller than the maximum opening degree as an upper limit in order to prevent the upper cover and the contact surface of the valve rod from repeatedly coming into mechanical contact with each other when a governor free operation is performed, the control part being configured to control the operation of the steam valve by setting the maximum opening degree as the upper limit when a load limiter operation is performed so that the contact surface does not repeatedly contact with the upper cover of the steam valve, wherein the flow rate at the limited opening degree and at the maximum opening degree is approximately constant.

2. The steam valve control device according to claim 1, wherein, when a change between the governor free operation and the load limiter operation takes place, the control part controls the steam valve so that an opening degree of the steam valve changes at a constant rate between the limited opening degree and the maximum opening degree.

3. A steam turbine system comprising:
a steam turbine;
a steam valve configured to adjust a flow rate of steam flowing into an inlet of the steam turbine, the steam valve having an upper cover and a valve rod which is installed so as to penetrate through the through hole of the upper cover, the valve rod having a contact surface which is formed so as to come into mechanical contact with the upper cover to prevent the steam from leaking from a gap between the upper cover and the valve rod when the steam valve is opened to a maximum opening degree; and a steam valve control device for controlling the steam valve to adjust a flow rate of steam flowing into an inlet of the steam turbine, the steam valve control device having a control part configured to control the operation of the steam valve by setting a limited opening degree limited to be smaller than the maximum opening degree as an upper limit in order to prevent the upper cover and the contact surface of the valve rod from repeatedly coming into mechanical contact with each other when a governor free operation is performed, the control part being configured to control the operation of the steam valve by setting the maximum opening degree as the upper limit when a load limiter operation is performed so that the contact surface does not repeatedly contact with the upper cover of the steam valve, wherein the flow rate at the limited opening degree and at the maximum opening degree is approximately constant.

* * * * *